US010024736B2

(12) United States Patent
Nivala et al.

(10) Patent No.: US 10,024,736 B2
(45) Date of Patent: Jul. 17, 2018

(54) FOOD THERMOMETER AND METHOD OF USING THEREOF

(71) Applicant: Apption Labs Ltd., Leicester (GB)

(72) Inventors: Teemu Nivala, Leicester (GB); Joseph Cruz, Encino, CA (US)

(73) Assignee: Apption Labs Limited, Leicester (GB)

( * ) Notice: Subject to any disclaimer, the term of this patent is extended or adjusted under 35 U.S.C. 154(b) by 28 days.

(21) Appl. No.: 15/192,850

(22) Filed: Jun. 24, 2016

(65) Prior Publication Data

US 2016/0377490 A1    Dec. 29, 2016

Related U.S. Application Data

(60) Provisional application No. 62/184,775, filed on Jun. 25, 2015.

(51) Int. Cl.
G01K 1/02       (2006.01)
G01K 13/00     (2006.01)

(52) U.S. Cl.
CPC ............. G01K 13/00 (2013.01); G01K 1/024 (2013.01); G01K 2207/06 (2013.01)

(58) Field of Classification Search
CPC .................................. G01K 1/12; G01K 1/024
See application file for complete search history.

(56) References Cited

U.S. PATENT DOCUMENTS

| | | | |
|---|---|---|---|
| 3,815,113 A | 6/1974 | Welch | |
| 4,297,557 A | 10/1981 | Tyler et al. | |
| 5,194,857 A * | 3/1993 | Gomez | G08B 5/228 340/7.63 |
| 6,568,848 B1 | 5/2003 | Chapman et al. | |
| 6,753,027 B1 * | 6/2004 | Greiner | F24C 7/08 374/E7.042 |

(Continued)

FOREIGN PATENT DOCUMENTS

| | | |
|---|---|---|
| DE | 4421373 | 12/1995 |
| DE | 102009019613 A1 | 11/2010 |

(Continued)

OTHER PUBLICATIONS

Tappecue Temperature Monitoring System http://www.tappecue.com 1 page.

(Continued)

*Primary Examiner* — Clayton E Laballe
*Assistant Examiner* — Leon W Rhodes, Jr.
(74) *Attorney, Agent, or Firm* — Barry IP Law

(57) ABSTRACT

A food thermometer includes a first portion for insertion into food. The first portion includes electronics sensitive to heat, and a third portion of the thermometer includes an antenna for transmitting data. According to one aspect, a completion time is estimated based on an ambient temperature and a rate at which the food temperature changes. According to another aspect, the thermometer includes an outer shell with a metallic portion and a non-metallic portion. An inner shell inside the outer shell extends from the metallic portion into the non-metallic portion such that the inner shell in the non-metallic portion serves as at least part of the antenna. The inner shell with the metallic portion of the outer shell serves as a coaxial transmission waveguide for an antenna signal.

19 Claims, 19 Drawing Sheets

(56) References Cited

U.S. PATENT DOCUMENTS

| | | |
|---|---|---|
| 7,075,442 B2 | 7/2006 | Lion et al. |
| 7,128,466 B2 | 10/2006 | Chang et al. |
| 7,129,834 B2 * | 10/2006 | Naruse ................... G01K 1/026 340/539.1 |
| 7,381,933 B2 | 6/2008 | Cristiani |
| 8,188,409 B2 | 5/2012 | Baier |
| 8,556,502 B2 | 10/2013 | Austen et al. |
| 8,557,317 B2 | 10/2013 | Sonnendorfer |
| 8,715,204 B2 | 5/2014 | Webster et al. |
| 8,730,038 B2 | 5/2014 | Durian |
| 8,931,400 B1 | 1/2015 | Allen |
| 2008/0259995 A1 | 10/2008 | Kuhn |
| 2009/0188396 A1 | 7/2009 | Hofmann et al. |
| 2010/0012645 A1 | 1/2010 | Baier |
| 2012/0203082 A1 * | 8/2012 | Livneh ............... A61B 1/00016 600/302 |
| 2013/0206015 A1 | 8/2013 | Jacoby et al. |
| 2013/0269539 A1 | 10/2013 | Polt |
| 2013/0277353 A1 | 10/2013 | Joseph et al. |
| 2015/0064314 A1 | 3/2015 | Manuel et al. |

FOREIGN PATENT DOCUMENTS

| | | | |
|---|---|---|---|
| DE | 202010016860 U1 | 3/2011 | |
| DE | 102009047418 | 6/2011 | |
| DE | 102010063474 A1 * | 6/2012 | ............. G01K 7/021 |
| EP | 1081476 | 3/2001 | |
| EP | 1577653 | 9/2005 | |
| EP | 1624724 A1 | 2/2006 | |
| EP | 1646851 | 4/2006 | |
| EP | 1646851 B1 | 1/2014 | |
| JP | 58135428 | 8/1983 | |
| WO | 0170087 | 9/2001 | |
| WO | WO 2010/023237 | 3/2010 | |
| WO | WO 2011/067176 | 6/2011 | |

OTHER PUBLICATIONS iGrill Thermometer http://idevicesinc.com/igrill 5 pages.

Brookstone Grill Alert Talking Remote Meat Thermometer http://brookstone.com/grill-alert-talking-remote-meat-thermometers 2 pages.

Written Opinion of the International Searching Authority in related International Application No. PCT/US2016/039405, 10 pages.

* cited by examiner

FOOD THERMOMETER AND METHOD OF USING THEREOF

CROSS REFERENCE TO RELATED APPLICATION

This application claims the benefit of U.S. Provisional Application No. 62/184,775 filed on Jun. 25, 2015, and entitled "SMART MEAT THERMOMETER AND METHOD OF USING THEREOF" by Teemu Nivala and Joseph Cruz, which is hereby incorporated by reference in its entirety.

FIELD

The present disclosure relates to food thermometers and methods of using thereof. More particularly, the present disclosure relates to a food thermometer that wirelessly transmits data.

BACKGROUND

Food thermometers such as meat thermometers have been used to help provide more consistent cooking results. The use of a meat thermometer, for example, can provide a visual indication on whether the meat is still undercooked or if the meat is in danger of being overcooked. However, these conventional types of food thermometers provide a passive indication of temperature and generally rely on the cook to remember to check the temperature.

More recently wireless food thermometers have been introduced to provide a more convenient display of the temperature. However, such wireless food thermometers generally provide only a passive display of the temperature and may not provide sufficiently accurate information during cooking, such as a completion time, when to adjust a temperature, when to start or finish a particular cooking stage such as searing, or how long to let the food rest after removing it from heat. In addition, such wireless food thermometers have a limited range for transmitting information, especially in light of the challenges to conserve space, provide a waterproof enclosure, and withstand high temperatures.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

This disclosure is directed to a smart food thermometer that can be positioned inside a heat chamber (e.g., grill, oven, etc.) or on a heat source.

One of the features is positioning electronic components that are sensitive to heat in a portion of the food thermometer that is inserted into the meat. The meat protects the sensitive electronic components from heat. The entire food thermometer can be positioned in the heat chamber, which advantageously eliminates the need for a wired connection to a device located on the exterior. The food thermometer includes a wireless thermal sensor and an antenna. The antenna communicates the sensed temperature data to a portable electronic device.

Figure 1:
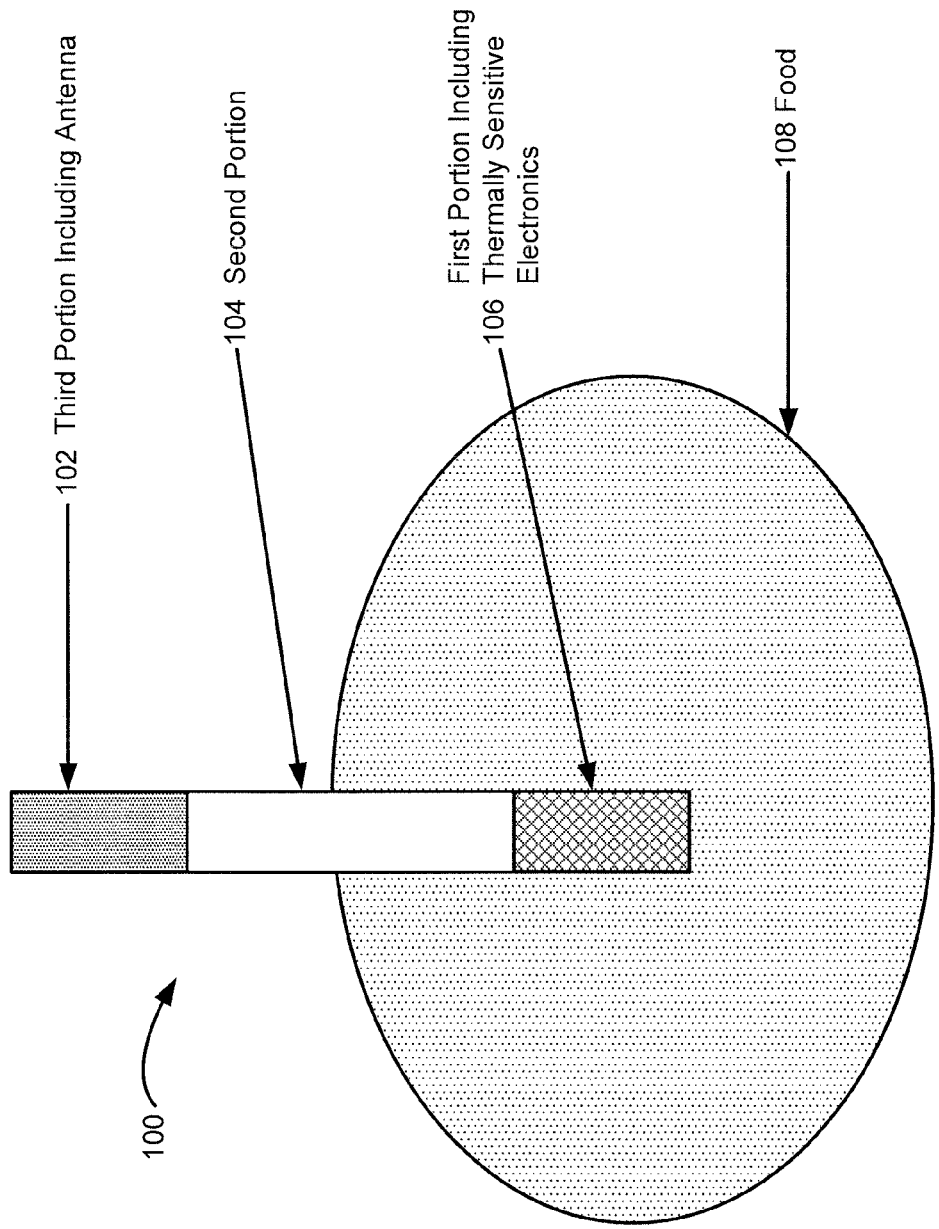
FIG. 1 illustrates a schematic diagram of a food thermometer according to an embodiment.

FIG. 1 illustrates a schematic diagram of a food thermometer 100 according to an embodiment. The thermometer 100 includes a first portion 106 having electronic components that are sensitive to heat. As shown in FIG. 1, the first portion is configured to be positioned in the food 108. A second portion 104 is connected to the first portion 106. In some implementations, the first portion 106 can include all of or part of a thermal sensor for detecting the temperature of the food 108. In other implementations, the thermal sensor for detecting the temperature of the food 108 can be located entirely or partially in a part of the second portion 104 that is inserted into the food 108.

A third portion 102 is connected to the second portion 104 and includes an antenna for wirelessly transmitting data based on the detected temperature of the food 108. In addition, some implementations may also include an ambient thermal sensor in the third portion 102 to detect an ambient temperature in the cooking vessel (e.g., oven or BBQ) that is close to the exterior surface of the food 108. In some examples, the food 108 is meat, but one of ordinary skill will appreciate that the thermometer 100 can be used with other types of food.

Figure 2A:
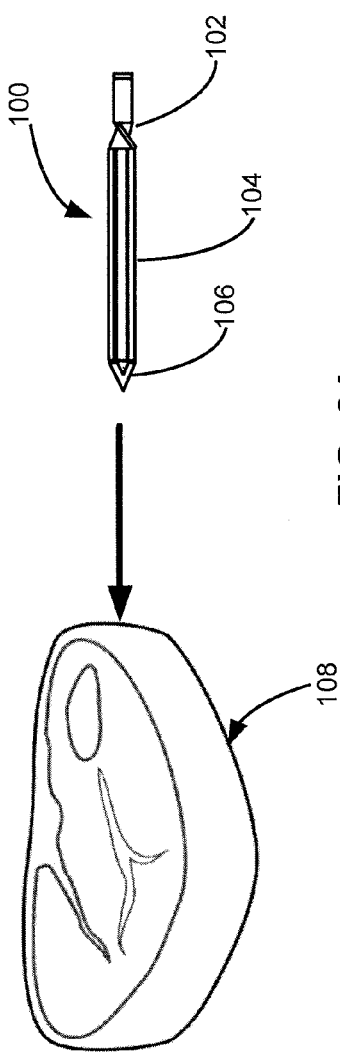
FIG. 2A shows the food thermometer of FIG. 1 being inserted in the direction denoted by the arrow into food according to an embodiment.
Figure 2B:
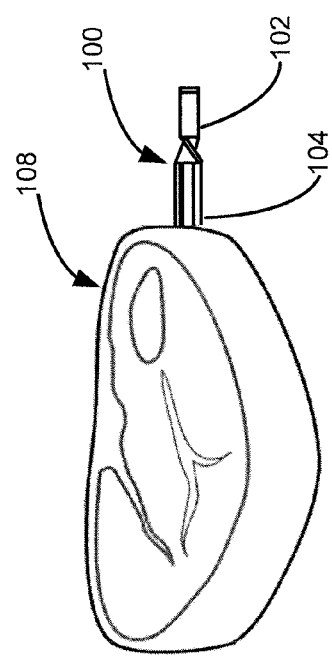
FIG. 2B shows the food thermometer of FIG. 2A after insertion into the food.

FIG. 2A shows the food thermometer 100 being inserted in the direction denoted by the arrow into the food 108. FIG. 2B shows the food thermometer 100 after insertion into the food 108. As shown in FIG. 2B, the third portion 102 remains outside of the food 108, but most of the second portion 104, and all of the first portion 106, are inside the food 108. In some implementations, the first portion 106 and the second portion 104 may not be separated from each other so that the first portion 106 and the second portion 104 correspond to portions of a continuous outer shell.

The lengths of the first portion 106 and the middle portion 104 can be chosen so that the thermally sensitive electronics are fully inserted into a wide variety of types of food. In one example, the first portion 106 and the second portion 104 each take up about half the length of the thermometer 100 before reaching the third portion 102. The relative lengths of the first portion 106 and the second portion 104 can vary in other implementations to accommodate different food thicknesses or food types. In one example, the second portion 104 is arranged so that a thermal sensor in the second portion 104 is positioned to measure temperature across an area inside the food 108. In other examples, a thermal sensor for measuring a food temperature can be located in the first portion 106. In addition, the cross section of the thermometer 100 can be chosen to have a relatively small cross sectional area so as not to significantly disrupt the composure of the food 108.

As discussed in more detail below, including the thermally sensitive electronics in the first portion 106 ordinarily allows for protection of the thermally sensitive electronics by using the food 108 to insulate the thermally sensitive electronics from the full heat of the cooking vessel. Other less thermally sensitive electronics may be included in the second portion 104 or the first portion 106.

For example, the thermally sensitive electronics can include a solid-state battery such as a thin film lithium battery or other battery type that may begin to degrade in performance at temperatures greater than a temperature of food being cooked (e.g., over 100° C. for meat). The ambient temperature inside a cooking vessel, such as an oven or a BBQ, can often reach temperatures in excess of 230° C. However, even when the ambient temperature inside the cooking vessel is 230° C., the temperature inside of a food such as a steak may only reach 77° C. for a well-done steak due to the thermal mass of the food.

In this regard, the thermally sensitive electronics in the first portion 106 may include a thermal sensor for detecting the temperature of the food 108. As discussed in more detail below, the third portion 102 or an end of the second portion 104 opposite the first portion 106 can include an ambient thermal sensor that can withstand or better detect higher temperatures than the thermal sensor used to detect the temperature of the food 108. The thermal sensor used to detect the temperature of the food 108 in the first portion 106 and/or the second portion 104 can be a different type of sensor than the ambient thermal sensor used to detect the ambient temperature near the food 108. In another implementation, the ambient thermal sensor may include an infrared sensor located in the first portion 106 or the second portion 104 that receives infrared light radiated from a component in the third portion 102, such as the antenna or the handle, to indirectly measure an ambient temperature. A light guide may also be used to direct the infrared light from the third portion 102 to the infrared sensor.

The location of the third portion 102 allows for the antenna to be unaffected by attenuation or interference that may be caused by the food 108. In implementations where the third portion 102 includes an ambient thermal sensor, locating the ambient thermal sensor in the third portion 102 ordinarily allows for the detection of the ambient temperature inside the cooking vessel that is adjacent the exterior surface of the food 108. Although conventional ovens and BBQs typically provide an indication of a temperature inside the cooking vessel, the actual temperature near the food 108 can differ from the temperature at other locations in the cooking vessel. As discussed in more detail below, detecting the ambient temperature near an exterior surface of the food 108 (e.g., within two or three inches) can provide an improved temperature measurement. This improved temperature measurement near the exterior surface of the food 108 can be used to determine a thermal mass of the food 108, a more accurate completion time, a more accurate resting temperature rise, and/or better instructions for cooking the food 108 to achieve a desired result.

Figure 3A:
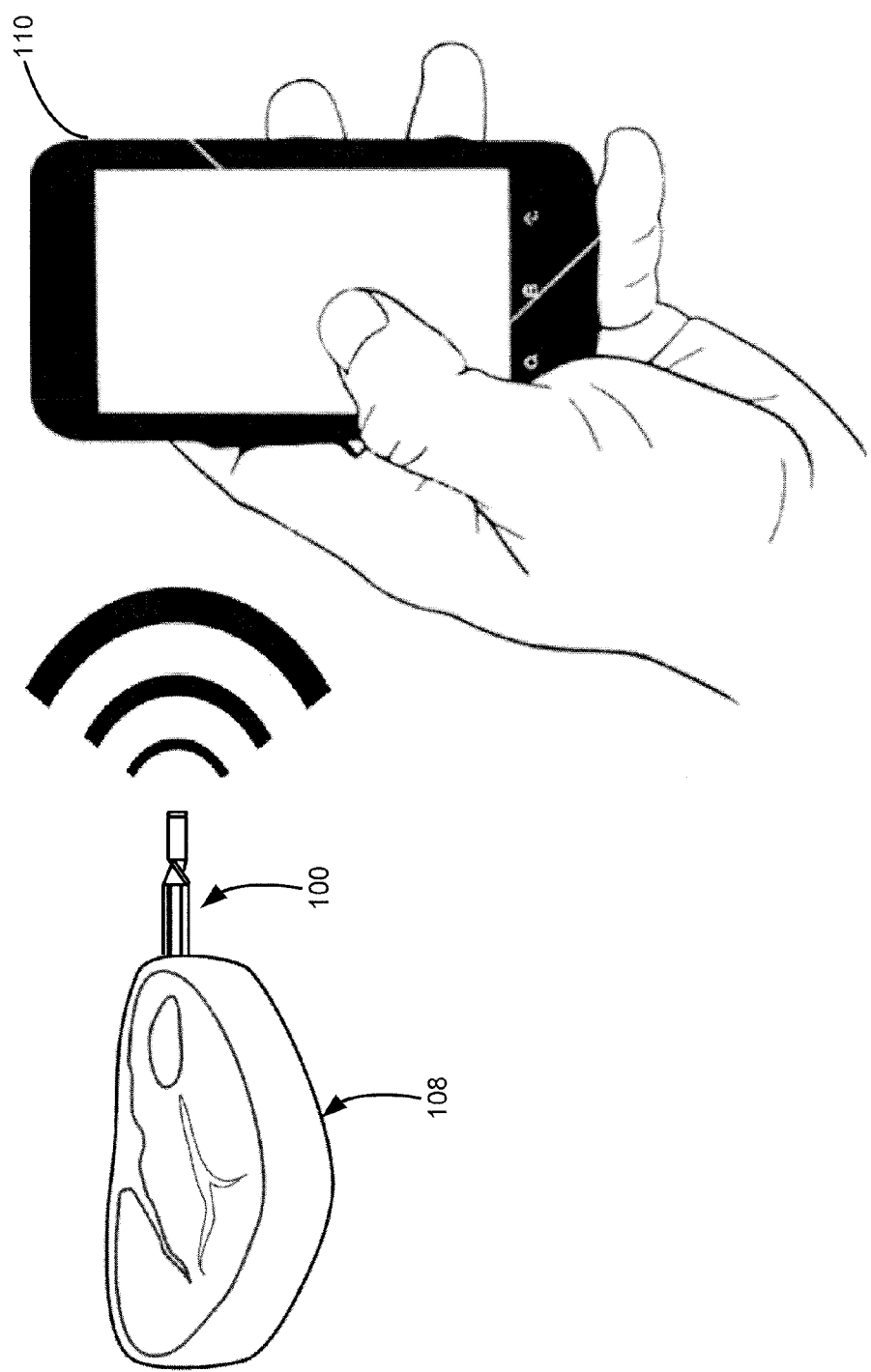
FIG. 3A shows wireless communications between the food thermometer and a portable electronic device according to an embodiment.

FIG. 3A shows wireless communications between the thermometer 100 and a portable electronic device 110. A unique advantage of the present invention is that the food 108 and thermometer 100 can be positioned inside a heating vessel (such as an oven), and the thermometer 100 can wirelessly communicate with a portable electronic device 110, without any wired connections and without any additional hardware that serves as a connection bridge between the thermometer 100 and the portable electronic device 110.

"Portable electronic device" as used herein refers to an electronic device having at least a processor, a memory, a display, and an antenna for enabling wireless communication. In one embodiment, the portable electronic device is a smartphone (such as an iPhone®) or a tablet computer (such as an iPad®). In other embodiments, the portable electronic device may be a smart watch or other types of smart devices with a processor and an antenna for communicating directly or indirectly with the thermometer.

Figure 3B:
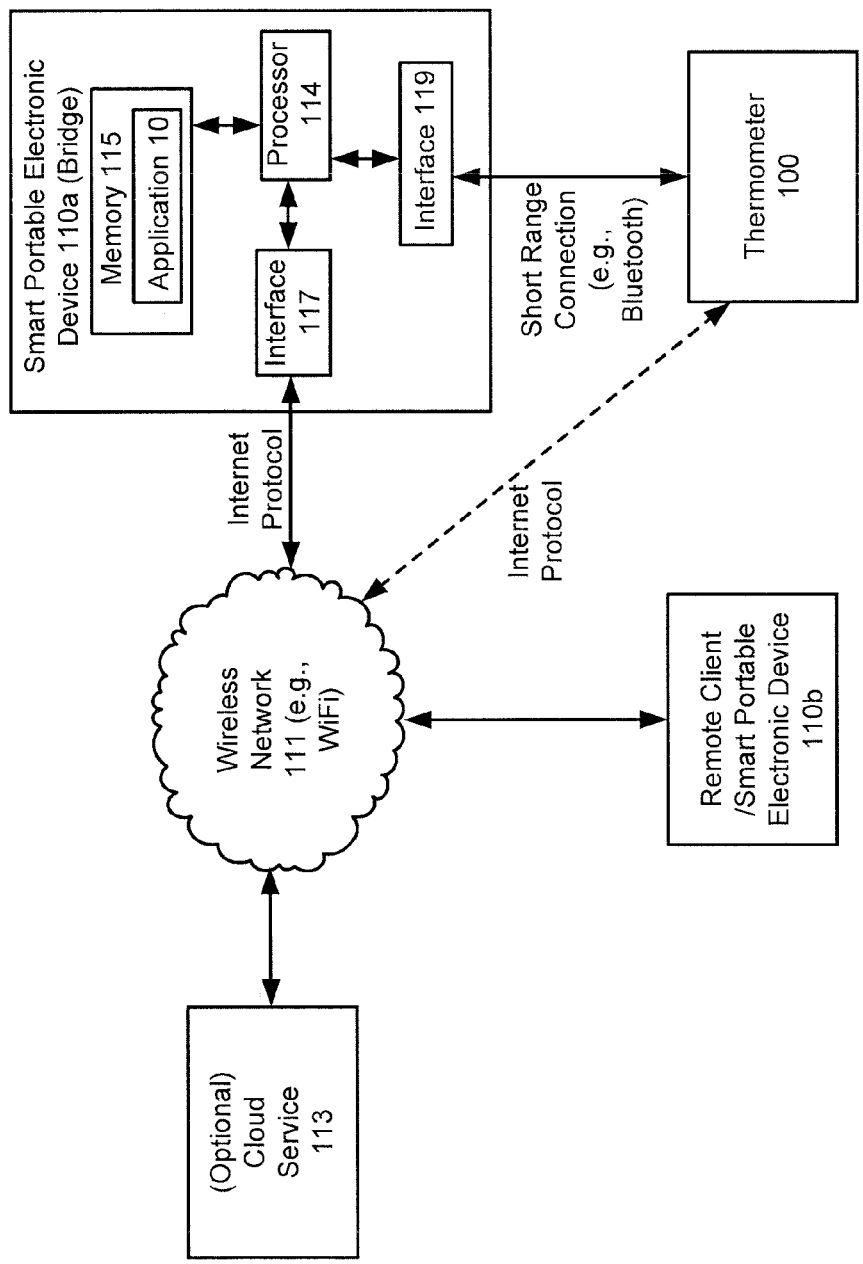
FIG. 3B is a system diagram showing wireless connections between the food thermometer of FIG. 3A and multiple portable electronic devices.

FIG. 3B is a system diagram showing wireless connections between the thermometer 100 and portable electronic devices 110 (e.g., 110a and 110b). In one implementation, there may be a direct connection to a smart portable electronic device 110a (e.g., a tablet, smartphone, laptop, etc.) using for example, a short range point to point communication protocol, such as a Bluetooth connection. If only short range communication is utilized, then other users may be out of the wireless range, or have limited access when the user of the electronic device 110a is connected with the thermometer 100. In some implementations, the portable electronic device 110a can be used as a connection bridge to connect to more remote clients/smart portable electronic devices 110b via a wireless network 111 (e.g., a Wi-Fi connection).

Utilizing the smart portable electronic device 110a as a bridge is particularly advantageous in this application in which the thermometer 100 is positioned in a cooking vessel such as a BBQ or oven in part because such cooking vessels can reduce wireless network range. The smart portable electronic device 110a shares information received from the thermometer 100 with other smart devices (e.g. 110b) via the wireless network 111 (e.g., an Internet Protocol network such as Wi-Fi), thereby allowing other users/devices at a greater distance to monitor the cooking process. The connection between the thermometer 100 and the wireless network 111 is shown as dashed to indicate that there is a virtual connection between them. In such an implementation, the actual connection is between the thermometer 100 and the bridge device (e.g., smart portable electronic device 110a) via interface 119, and also between the bridge device and wireless network 111 via interface 117. For example, the bridging technology may be based on Bluetooth 4.0 or Bluetooth 4.2, which allows Internet Protocol connectivity (e.g., IPv6) via Bluetooth 4.2 capable bridge devices to the local area network and the internet. The foregoing described connectivity is provided as an example. The bridge technology can enable other types of wireless connections based on design concerns and parameters.

Although in FIG. 3B, the bridge device is shown as a smart portable electronic device 110, the bridge device can alternatively be a physical bridge device such as the charging apparatus 700 discussed below with respect to FIGS. 7A and 7B. In such an implementation, the charging apparatus 700 can serve a dual purpose as a wireless connection bridge between the thermometer 100 and the wireless network 111 (similar to the bridge connectivity set forth above as to the smart portable electronic device 110a), and as a charging device when the user seeks to charge the thermometer 100.

It can be appreciated that the wireless network 111 may be a local area network and/or a wide area network such as the internet. In one implementation, the system utilizes a connection to the internet and a cloud-based service. The information transmitted by the thermometer 100 can optionally be shared via cloud service 113 instead of a more direct connection between two or more smart devices.

As shown in FIG. 3B, the electronic device 110a includes a processor 114 configured to execute application 10 for processing data provided by the thermometer 100 and presenting information to the user based on the processed data. Application 10 can include computer-executable instructions stored in a memory 115 of the electronic device 110a and accessed as needed by processor 114. Thermometer 100 sends data such as temperature measurements to an interface 119 of the electronic device 110a. The processor 114 processes the received data in accordance with execution of the application 10, and provides information using a user interface of the application 10 on one or more output devices (e.g., display and/or speaker) of the electronic device 110a. The processor 114 may also optionally send the processed data or data generated by executing the application 10 to the wireless network 111 via an interface 117.

The user interface of the electronic device 110a can, for example, display a current temperature of the food, a completion time prediction, or recommendations on how to cook the food 108 to achieve a result specified by the user such as a final doneness of the food 108 (e.g., medium or well-done). The cooking instructions can include, for example, adjustments to temperature, when to flip a piece of meat, when to sear the food, when to remove the food from heat, or how long to let the food rest after removing it from heat. Devices known in the art have not been able to accurately predict completion times, predict a resting temperature rise after removing the food from the cooking vessel, or provide accurate instructions on when to adjust the cooking temperature or perform another cooking action.

As noted above, more accurate predictions on completion time and resting temperature rise can ordinarily be made by utilizing dual-sensor technology. Using an ambient or external thermal sensor in or near the third portion 102 can enhance estimation of heat input at the location of the food 108, which can vary when the food 108 is moved, turned, or when changes in cooking environment occur, such as opening the hood of a BBQ, adjusting heat on a gas grill, or charcoal fuel losing heat. The heat input at the location of the food 108 can be estimated more accurately using an ambient or external thermal sensor adjacent an exterior surface of the food 108 and measuring the ambient temperature over a period of time.

In addition, the processor 114 can use application 10 to generate a heat response of the food 108 using a detected internal temperature in the second portion 104 over a period of time. The processor 114 can also use application 10 to determine a thermal mass of the food 108 using the measured internal temperature and the measured ambient temperature over time. In other implementations, the heat response and/or the thermal mass of the food 108 can be determined by the cloud service 113, the remote electronic device 110b, electronics of the thermometer 100, or combinations thereof.

In addition, the location of the ambient thermal sensor near the exterior surface of the food 108 ordinarily allows for an accurate determination of a thermal mass for the food 108. The thermal mass or heat capacity of the food 108 represents the ability of the food 108 to store heat and can affect how quickly the food 108 heats up or cools off. By using actual measurements (i.e., the internal temperature and the external temperature of the food 108), as opposed to a previously stored value for a given food, variations in composition from a typical composition (e.g., higher fat content, lower density) are accounted for in the thermal mass determined from the temperature measurements. As discussed in more detail below, a thermal mass determined from empirical data for the actual food being cooked ordinarily provides a more accurate determination of useful information such as a completion time, a resting temperature rise, or specific instructions on cooking the food 108, such as temperature adjustments during the cooking process.

Unlike conventional methods for estimating a completion time based only on an internal temperature or an external temperature, processor 114 executing application 10 can more accurately estimate a completion time based on a thermal mass of the food 108 by using the current internal temperature of the food 108, the ambient temperature adjacent the food 108, and time data. In other implementations, the estimation of a completion time can be performed by the cloud service 113, the remote electronic device 110b, electronics of the thermometer 100, or combinations thereof. Completion time estimates can be further refined by user input indicating, for example, a type of food being cooked, a weight of the food, or the type of preparation desired. In some implementations, the user input can be used to provide an initial estimate of the thermal mass and the completion time, which can be adjusted based on data received from thermometer 100 as the food 108 is being cooked.

The application 10 according to some implementations can advantageously estimate a resting temperature rise that can be accounted for in the completion time estimate or in cooking instructions provided to the user. Conventional cooking devices have not been able to account for a resting temperature rise of food in the cooking process. This can be due in part to a failure to accurately determine or consider a thermal mass of the food that is actually being cooked, rather than using a preset value for a certain food type.

Resting is the process during which the food is removed from the heat source and allowed to "rest" under normal ambient temperatures such as room temperature. During this resting period, the food temperature stabilizes and distributes more evenly within the food due to heat flowing from the warmer exterior of the food to its cooler interior. The resting temperature rise can be, for example, several degrees and can make the difference between a medium-rare or medium doneness in a steak. For most meats, the resting period also helps fluids redistribute more evenly within the meat. Resting temperature rise is a dynamic parameter that can depend upon several factors such as the thickness of the food, the thermal mass of the food, and the cooking temperature towards the end of the cooking cycle. Usually, the cooking temperature from the start of cooking has already had time to equalize, but the cooking temperature near the end of the cooking cycle will usually have more of an effect on the resting temperature rise.

Figure 4:
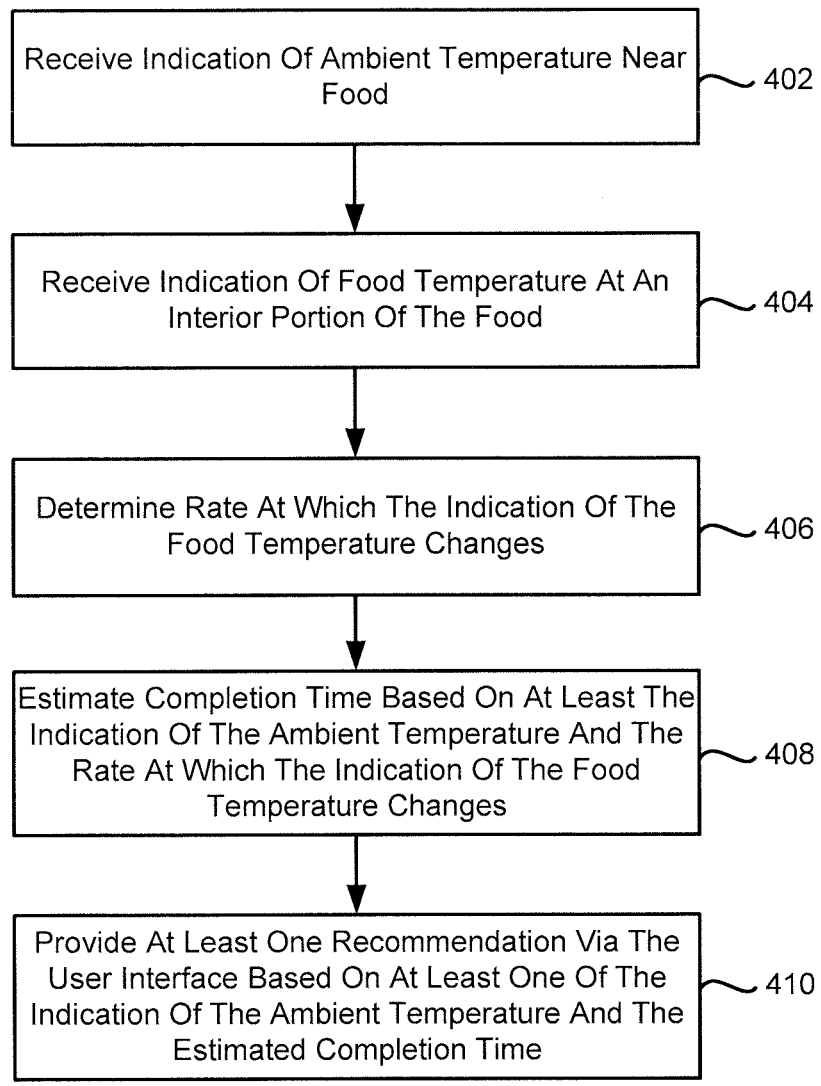
FIG. 4 is a flowchart for a completion time estimation process according to an embodiment.

FIG. 4 is a flowchart for an example completion time estimate process that can be partly or wholly performed by the processor 114 of a portable electronic device, a charging device in wireless communication with the food thermometer, or by the food thermometer itself. To enhance accurate prediction, the process of FIG. 4 considers both an ambient temperature and the temperature of the food. In some implementations, the process of FIG. 4 may also estimate a resting temperature or resting temperature rise to allow cooking to end at a lower temperature. This advantageously allows the resting temperature to rise to finish the cooking process throughout the food to a target temperature. In addition, the estimated resting temperature or resting temperature rise can take into account the thermal mass of the food in substantially real time.

The current heat being applied is determined by current or recent measurements of an ambient thermal sensor in the thermometer. In one implementation, only or primarily recently applied heat is taken into account as it has not yet progressed to internal parts of the meat. In this regard, the time parameters for the estimation can depend on the thermal mass of the food 108 being cooked. For example, the last three to five minutes of ambient heat can be averaged and used as input heat for a resting temperature rise prediction. The resting temperature rise prediction and/or an adjusted target temperature can be displayed to the user of the portable electronic device 110a to allow the user to end cooking.

As shown in FIG. 4, an indication of an ambient temperature near the food is received in block 402. The indication of the ambient temperature can be received by a remote device via a wireless signal transmitted from the thermometer. In another implementation, a processor in the electronics of the thermometer may receive the indication of the ambient temperature from an ambient sensor of the thermometer. The location of the ambient temperature measurement can be near to an exterior of the food, such as within three inches of the exterior of the food to provide a more accurate indication of the heating of the food.

In block 404, an indication is received of the food temperature at an interior portion of the food. With reference to the example of thermometer 100 discussed above, this indication can come from one or more thermal sensors located in the first portion 106 and/or the second portion 104. As with the indication of the ambient temperature, the indication of the food temperature may be received by a processor of the thermometer or by a remote device.

In block 406, the rate at which the indication of the food temperature changes is determined. In one implementation, this can include determining a temperature rise value based on an indication of the ambient temperature received in block 402. For example, an ambient temperature range can be used to select the temperature rise value, X. This can ordinarily allow for the ambient temperatures near the food 108 to be accounted for in determining the temperature rise value X.

In one implementation, the temperature rise value X is selected from different temperature rise values corresponding to different ambient temperature ranges and/or types of food. In such an example, a table of temperature rise values can be stored in memory 115 of device 110 for access by the processor 114. A user of the portable electronic device 110a, for example, may select a food type for the food from a plurality of food types (e.g., ribeye steak, sirloin steak, chicken), with the different food types being associated with different temperature rise values for the same ambient temperature value or range of ambient temperature values. The selection of a food type can ordinarily further customize the estimation of a completion time and/or a resting temperature rise.

In block 408, a completion time is estimated based on at least the indication of the ambient temperature and the rate at which the indication of the food temperature changes. In this regard, a thermal mass or thermal conductivity of the food is considered by using the rate at which the indication of the food temperature changes, and the heat applied to the food is also considered through the indication of the ambient temperature.

In one implementation, an amount of time is measured for the indication of the food temperature to increase by a temperature rise value X as discussed above with reference to block 406. This measurement may be performed by a processor of the thermometer monitoring a signal from the thermal sensor. In other implementations, the thermometer may transmit values for the temperature signal to a remote device that measures the time for the indication of the temperature to increase by the temperature rise value.

The completion time may include estimating a resting temperature rise for an amount of temperature rise in the food after the food will be removed from heat. As discussed in more detail below, a thermal value of the food can be determined based on at least the temperature rise value and at least one of a food type of the food and an initial amount of time for the indication of the food temperature to increase by the temperature rise value during an initial period of cooking. The thermal value for the food is then used to estimate the resting temperature rise. In such an example, the thermal value represents a thermal conductivity or thermal mass of the food. This allows for the ability of the food to heat up to be considered when estimating a completion time or a resting temperature rise.

For example, a time t1 can be measured from the beginning of cooking until the temperature of the food 108 rises by a temperature rise value X during an initial portion of the cooking process. A second time t2 can be measured for the temperature of the food 108 to rise by the value X during a middle or more steady-state portion of the cooking process that follows the initial portion of the cooking process. A thermal value k can be calculated based on the temperature rise during the middle portion of cooking using Equation 1 below.

$$k = X/t2 \qquad \text{Equation 1}$$

The resting temperature rise can be calculated using Equation 2 below.

$$\Delta T_{rest} = k(t1 - t2) \qquad \text{Equation 2}$$

As an example, if it takes ten minutes for the temperature of food 108 to rise by 10° during the initial portion of cooking, and it takes five minutes for the temperature of food 108 to rise by 10° during the middle portion of cooking, the thermal value is 2°/min using Equation 1 above. The resting temperature rise is then calculated as 10° using Equation 2 (i.e., 2×(10 min−5 min)). Other implementations may use a different calculation to account for the thermal mass or conductivity of the food 108 in predicting a resting temperature rise.

In situations where thermometer 100 includes an ambient thermal sensor, the ambient thermal sensor may be used to more accurately detect a cooking start time by detecting when the ambient temperature rises faster than a threshold value, such as a temperature increase of 5° C. This detection can be used in the example above to trigger the measurement for t1. In other implementations, the detection of the beginning of cooking can begin with a relatively small (e.g., 1° C.), but sudden temperature change indicating the insertion of the thermometer into the food 108. In another implementation, the beginning of cooking can be detected by the first temperature rise of the food 108 that is measured by the thermometer 100. In yet another implementation, a user may indicate the start of cooking using a portable device, such as with a user interface executed by device 110a in FIG. 3B.

In some implementations, device 110a or another device calculating a resting temperature rise may use readings from the ambient sensor to consider changes in the cooking temperature during the cooking process. In one such implementation, an average of recent ambient temperatures is used to calculate an adjusted resting temperature rise as shown below in Equation 3.

$$\Delta T_{restadj} = \Delta T_{rest}(T_{amb}/T_{ambstart}) \qquad \text{Equation 3}$$

A completion time can be estimated using the thermal value of the food. In one implementation, a remaining temperature rise is calculated by subtracting a current temperature for the food and the adjusted resting temperature rise from a target temperature as shown below in Equation 4.

$$\Delta T_{remaining} = T_{target} - (T_{current} + \Delta T_{restadj}) \qquad \text{Equation 4}$$

The estimated completion time can then be estimated by dividing a recent thermal value by the remaining temperature rise calculated from Equation 4 above. This implementation for calculating the estimated completion time or estimated remaining time is expressed below in Equation 5.

$$t_{remaining} = k_{recent}/\Delta T_{remaining} \qquad \text{Equation 5}$$

The recent thermal value $k_{recent}$ can be calculated in a similar manner as the thermal value k discussed above.

The blocks discussed above may be repeated at various times throughout a cooking process to provide updated estimates on the completion time.

Some implementations can advantageously take into account the cooking process and make real time recommendations as to cooking completion time and temperature. A cooking process for meat often includes separate stages such as sear, cook, and rest. During the searing stage, high heat is applied to the meat to achieve surface crust texture, color, and flavor. During the cooking stage, the heat is applied to the meat until internal temperature reaches desired doneness or internal temperature. During the resting stage, the meat is removed from heat and the internal temperature rises as heat between the surface of the meat and its internal parts equalizes.

With reference to block 410 of FIG. 4, at least one recommendation is provided via a user interface based on at least one of the indication of the ambient temperature and the estimated completion time. For example, recommendations may be provided to a user in real time regarding what time and temperature to move to the next stage of cooking. The cooking process can include a traditional progression of sear, cook, and rest, or a reverse sear progression (i.e., cook, sear, rest), or a progression of cook, rest, and sear. The estimates for time and temperature, can be based on the same thermal mass and heat application considerations discussed above. According to the foregoing aspects, separate temperature and time estimates can be provided for different stages of cooking to allow for separate estimates during each stage.

In addition, the stage of cooking during a cooking process of the food can be determined by using the ambient temperature detected by an ambient thermal sensor in the thermometer. For example, a relatively low ambient temperature can correspond to a resting stage, a relatively higher range of ambient temperature can correspond to a cooking stage, and an even higher ambient temperature range can correspond to a searing stage. Using the ambient thermal sensor, cooking stages can be automatically detected by the thermometer or a portable electronic device without additional user input. Alternatively, other implementations can allow for user input to indicate a particular cooking stage.

Figure 5:
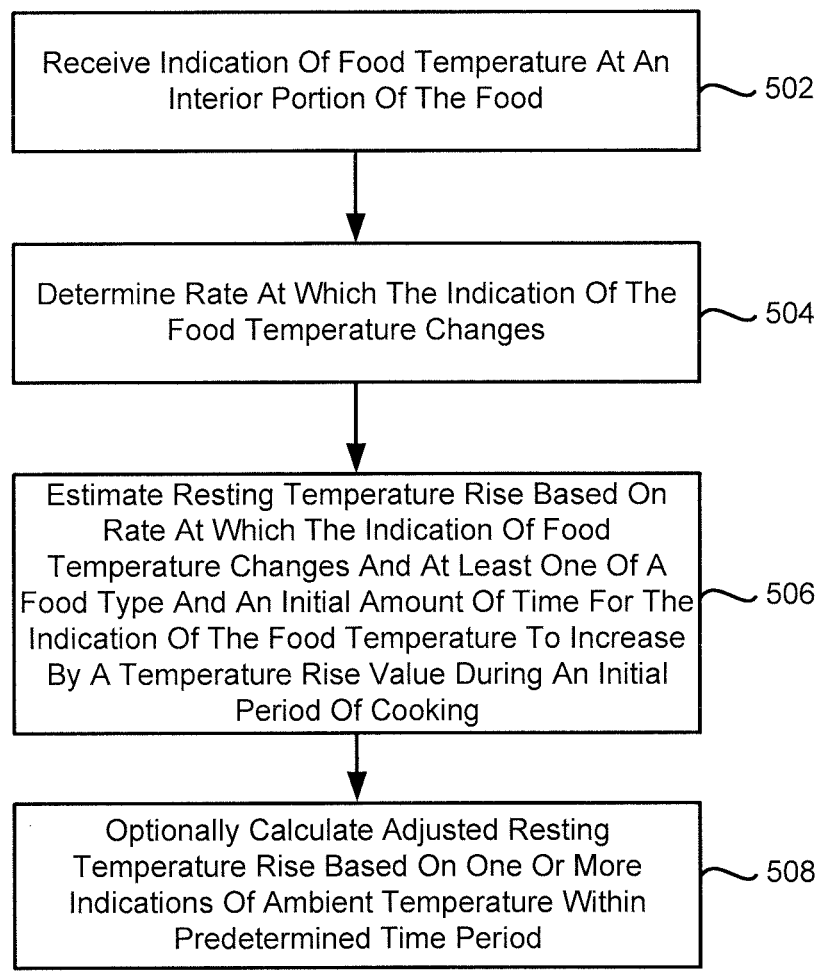
FIG. 5 is a flowchart for a resting temperature rise estimation process according to an embodiment.

FIG. 5 is a flowchart for an example resting temperature rise estimation process that can be partly or wholly performed by the processor 114 of a portable electronic device, a charging device in wireless communication with the food thermometer, or by the food thermometer itself. The resting temperature rise estimation process of FIG. 5 can be performed as a sub-process of a completion time estimation process as in FIG. 4 or as part of its own process or another process.

The description for blocks 502 and 504 can be understood with reference to the description above for blocks 404 and 406 of FIG. 4, so a description for these blocks is not repeated here. In block 506, a resting temperature rise is estimated based on the rate at which the indication of the food temperature changes. In addition, block 506 considers at least one of a food type and an initial amount of time for the indication of the food temperature to increase by a temperature rise value during an initial period of cooking. In one example, a food type (e.g., ribeye steak, chicken, brisket) may be selected by a user via a user interface. The food type can then indicate a thermal mass of the food that can be used with the rate determined in block 504 to estimate a resting temperature rise for the food.

Other implementations may consider an initial amount of time for the indication of the food temperature to increase by a temperature rise value. The initial amount of time can be used with a thermal value as discussed above with reference to Equation 2 to calculate a resting temperature rise.

In block 508, an adjusted resting temperature rise can be calculated based on one or more indications of an ambient temperature within a predetermined time period. In one example, an average of recent ambient temperature values can increase or decrease the resting temperature rise estimated in block 506. In yet another example, a current ambient temperature value can increase or decrease the resting temperature rise estimated in block 506. For example, the current ambient temperature value may be compared to a reference ambient temperature value, such as an ambient temperature value at the start of cooking. This comparison can provide an estimate of the heat applied to the food, which can be used to adjust the resting temperature rise.

Figure 6:
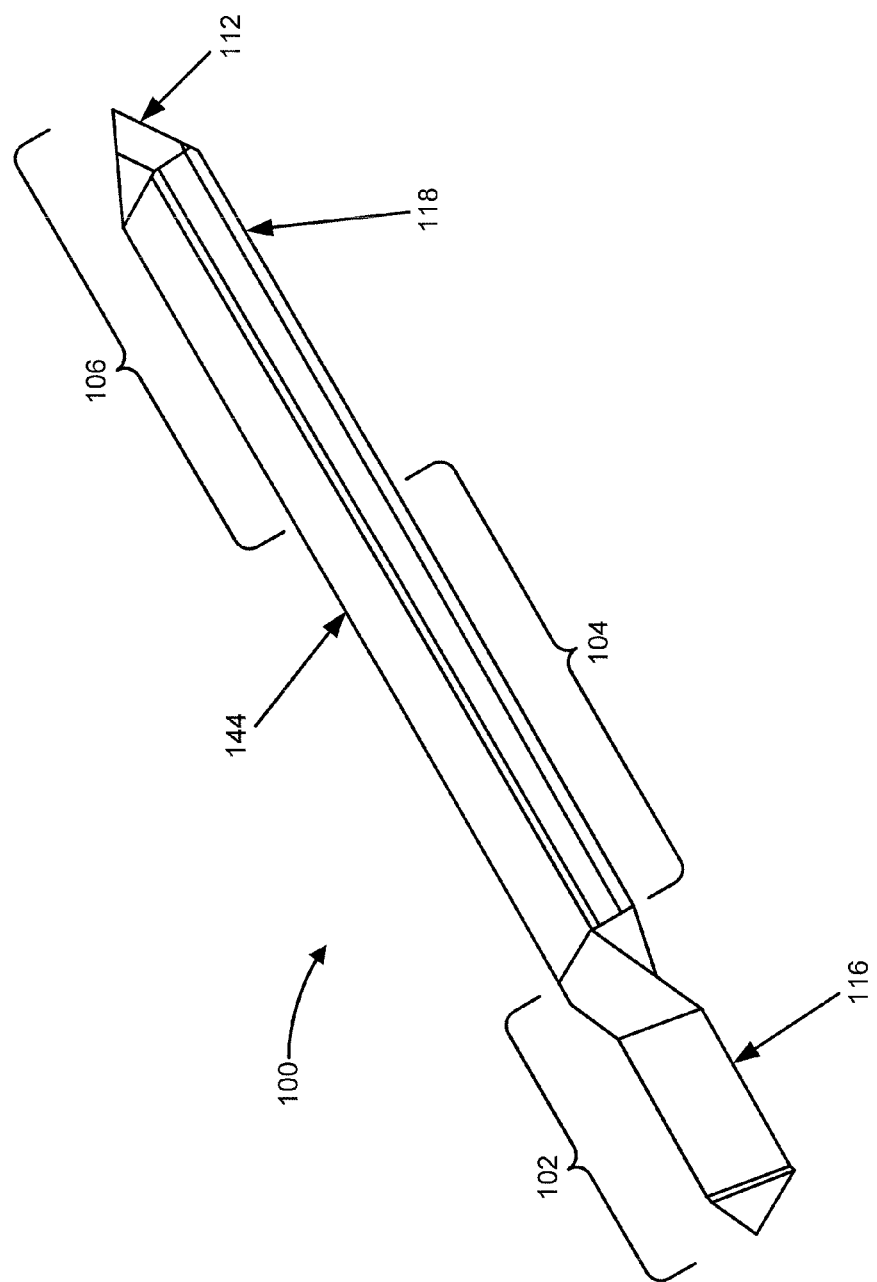
FIG. 6 shows an isometric view of a food thermometer according to an embodiment.

FIG. 6 shows an isometric view of the thermometer 100 according to an embodiment. The third portion 102 includes an ambient thermal sensor and an antenna. The handle 116 can be held by a user to insert or remove the thermometer 100 into or out of the food 108. The handle or hilt 116 can include a material for heat resistance and safer handling of the thermometer after heating. In some implementations, the hilt 116 can include an electrically insulating material that can withstand the high temperatures of a cooking environment. For example, the material of the hilt 116 can include alumina, zirconia, ceramic porcelain, glass, or a high temperature plastic for relatively lower cooking temperature applications.

The first portion 106 includes electronics that are sensitive to heat. The heat sensitive electronics of the first portion 106 are positioned close to a tip portion 112 of the thermometer to ordinarily allow for the greatest amount of insulation from the food 108 in protecting the heat sensitive electronics from high temperatures. The probe shaft 144 may include an exterior blade 118 made of stainless steel or another stainless material to allow for easier insertion of the thermometer 100 into the food 108.

As discussed above, the third portion 102 can include an ambient thermal sensor to measure the ambient temperature near the food 108. The third portion 102 can also include an antenna for establishing wireless communication with a portable electronic device such as electronic device 110 in FIG. 3A.

Figure 7:
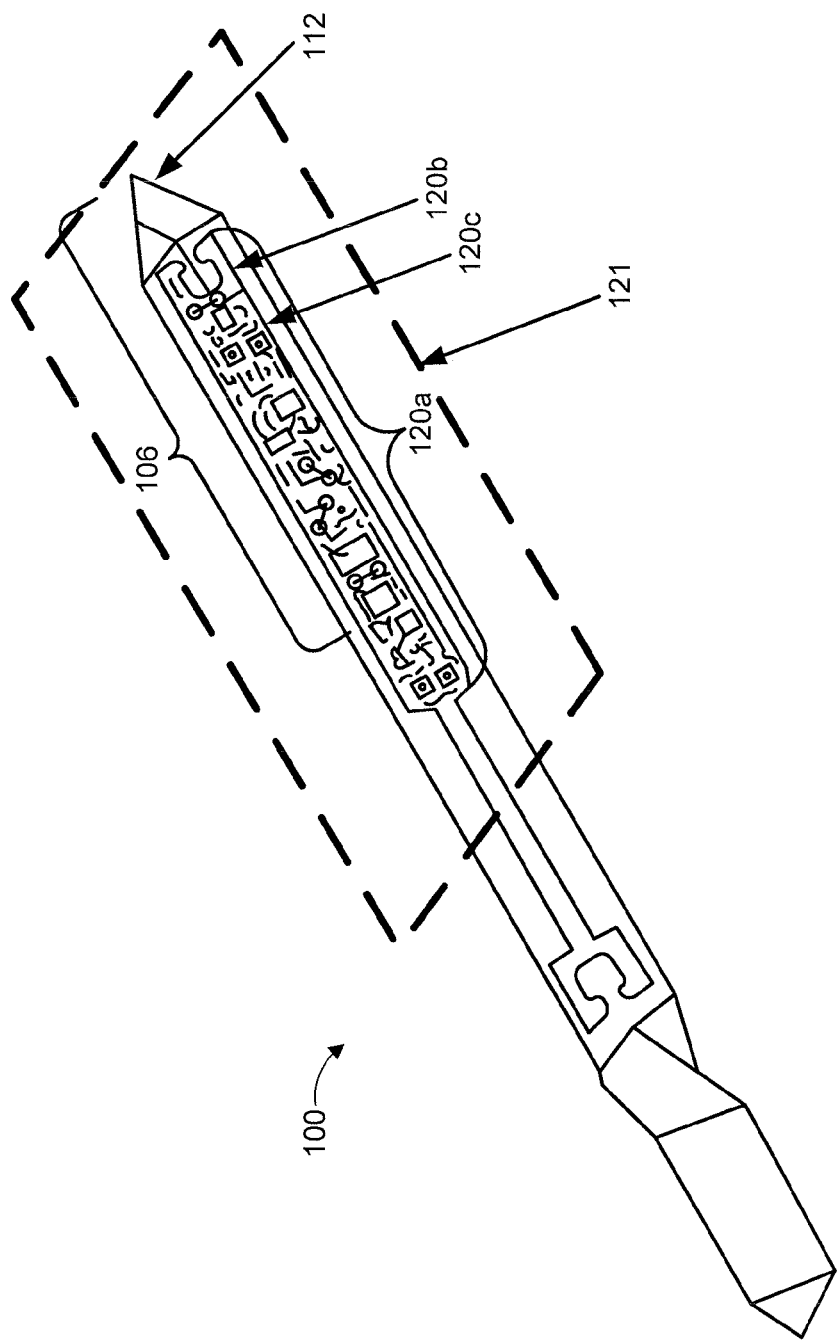
FIG. 7 is a view of the food thermometer of FIG. 6 showing internal components according to an embodiment.

FIG. 7 is an internal view of the thermometer 100 showing internal components encompassed by the probe shaft 144. Box 121 is shown for illustration purposes to roughly delineate parts of the thermometer 100 that are usually positioned inside the food 108. As shown in FIG. 7, box 121 includes the printed circuit board (PCB) 120a, battery 120b, and other electronic components 120c that are sensitive to heat. In this regard, battery 120b and electronic components 120c are located closer to the tip portion 112 than electronics on PCB 120a that are less sensitive to heat so that the battery 120b and the electronic components 120c are better insulated by the food 108. In other implementations, all of the electronics of thermometer 100 may be located in the first portion 106.

Figure 8:
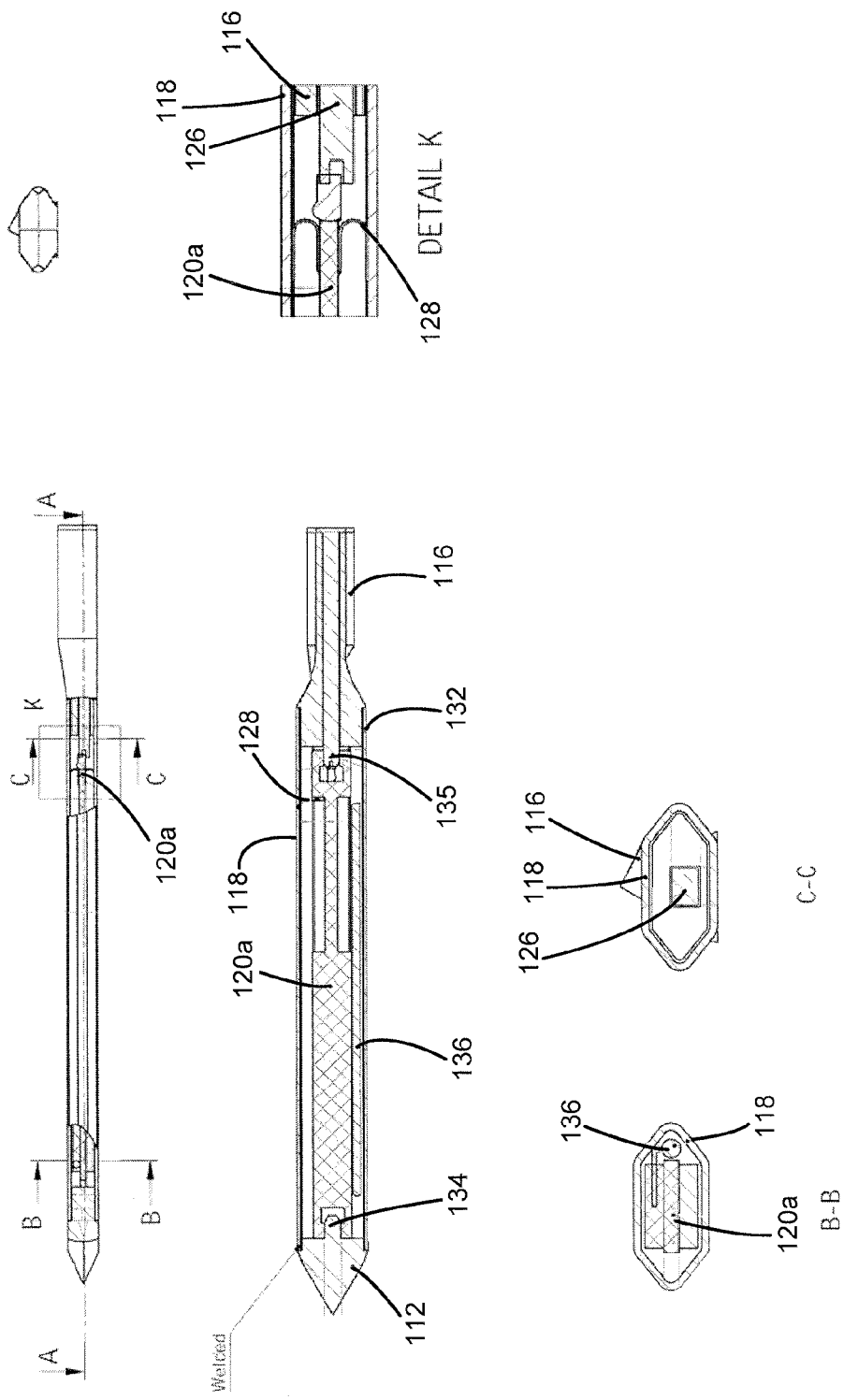
FIG. 8 illustrates various components of a food thermometer according to an embodiment.

FIG. 8 further illustrates an example arrangement of various components in the food thermometer 100 according to an embodiment. A person of ordinary skill in the art will appreciate that the relative proportions shown in FIG. 8 and example materials discussed below can differ in different implementations.

As shown in FIG. 8, the thermometer 100 includes a thermal sensor 136 inside the second portion 104 of the thermometer 100 that is in electrical communication with the electronics 120a. The thermal sensor 136 is located within the thermometer 100 to detect a temperature of the food 108. In the example of FIG. 8, the thermal sensor 136 includes a thermocouple wire that extends along a length of a portion of the thermometer 100 to provide a temperature measurement across a portion of the food 108. In other implementations, the thermal sensor 136 can include other types of thermal sensors such as a Resistance Temperature Detector (RTD), one or more thermistors, or an infrared sensor.

A ground spring 128 serves to help ground the electronics 120a to the exterior or blade of the thermometer 100. In some implementations, the exterior or blade 118 of the thermometer 100 can include a ferritic stainless steel. The tip 112 can similarly be made of a ferritic stainless steel. The electronics 120a are attached to the tip 112 and the antenna 126 with a push fit at each of locations 134 and 135, respectively.

The antenna 126 is positioned in the third portion 102 and can include a metal material such as stainless steel, a copper material, or a copper alloy with nickel that is in electronic communication with the electronics 120a. In the implementation shown in FIG. 8, the antenna 126 is a quarter wave monopole antenna. In other implementations, the antenna 126 can be a half wave dipole. The dimensions and shape of the antenna 126 can vary based on the RF technology being used. In the case where the antenna 126 is a quarter wave monopole, an effective length of the antenna 126 is approximately a quarter of the wavelength used at a particular frequency. For example, when using a frequency of 2.4 GHz, the effective length of the antenna would be 27 mm. The effective length of the antenna 126 may take into consideration a folding of the antenna to decrease the space consumed by the antenna 126 in the thermometer 100. The length of the middle portion of the thermometer 100 is sized to be at least twice the length of the antenna 126 when using a quarter length monopole.

In the example of FIG. 8, the tip 112 can be welded to the blade 118 and a silicon based flexible glue can be used to affix the electronics 120a and the antenna 126 to the exterior structure of the thermometer 100 near the hilt 116.

In other implementations, an interference fit attaches the electronics 120a and/or the antenna 126 to the exterior structure of the thermometer 100. The interference fit may include, for example, using a tight fitting metal gasket or an arrangement where an internal surface of the exterior structure fits over a surface of the electronics 120a or a surface of the antenna 126. Using an interference fit generally shortens an assembly time since there is no need for a glue to cure and can provide improved waterproofing and high temperature durability as compared to most adhesives. The use of an interference fit can also eliminate perceived food safety concerns associated with the adhesive escaping from the interior of the thermometer 100.

Figure 9B:
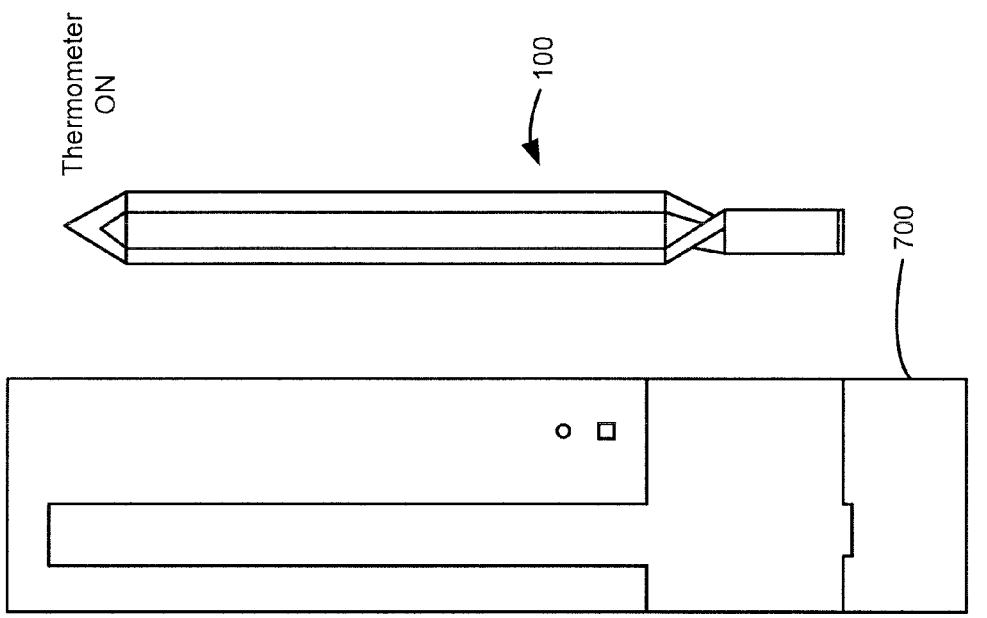
FIG. 9B shows the thermometer of FIG. 9A removed from the charging apparatus.
Figure 9A:
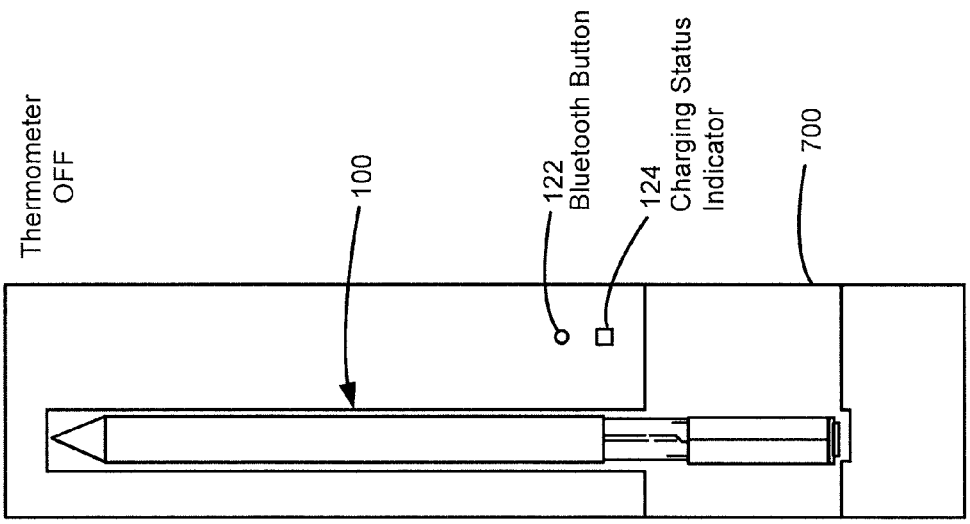
FIG. 9A shows a charging apparatus for charging a battery of a food thermometer according to an embodiment.

FIG. 9A shows a charging apparatus 700 for charging the battery 120b of the thermometer 100 according to an embodiment. FIG. 9B shows the thermometer 100 removed from the charging apparatus 700. In this state, the thermometer 100 is automatically set to an ON state.

In some implementations, the thermometer 100 is automatically set to an off state or low power state when positioned in the receptacle of the charging apparatus 700 to conserve power when the thermometer 100 is not in use. During the off state or the low power state, certain portions of the electronics 120a may be powered off that do not relate to charging the battery 120b or detecting a charging state of the thermometer 100.

Similarly, the thermometer 100 can be automatically activated or turned on when the thermometer is no longer in contact with the charging apparatus 700. When activated, the thermometer 100 may attempt to pair with a portable device such as portable device 110a or otherwise attempt to wirelessly communicate. In addition, circuitry for measuring the temperature of the thermal sensor 136 and an ambient temperature may also be powered. Thermometer 100 may detect that it is no longer in contact with the charging apparatus 700 via a contact of the thermometer 100 being no longer in contact with charging apparatus 700 or when charging of the thermometer 100 stops. In this regard, some implementations may include charging of the thermometer 100 through a direct contact with the charging apparatus 700, while other implementations may charge using inductive charging.

The automatic activation of the thermometer 100 using a voltage supplied by the charging apparatus 700 can ordinarily reduce the need for additional components such as an external button or switch to activate or wake the thermometer 100 from the low power or deactivated mode. Such an external button or switch on the thermometer 100 can complicate the manufacture and increase the cost of the thermometer due to waterproofing, sealing, or high heat design specifications.

In the example of FIGS. 8A and 8B, a Bluetooth button 122 is provided for allowing the charging apparatus 700 to wirelessly communicate with a portable electronic device to indicate a status of charging. The charging status indicator 124 (e.g., an LED) is also provided to indicate the charging status. If the thermometer 100 has less than a certain threshold of power (e.g., 95% state of charge), the charging apparatus 700 will automatically charge it to full power.

As noted above, the charging apparatus 700 may also serve as a wireless connection bridge between the thermometer 100 and a wireless network (e.g., wireless network 111 in FIG. 3A). The charging apparatus 700 may also include an interface for connecting to the wireless network.

In addition, other embodiments may include a display on the charging apparatus 700 to provide temperature information received from the thermometer 100 when it is in use. In this regard, the charging apparatus can include an interface for communicating with the thermometer 100. In some embodiments, the charging apparatus 700 can include the processor 114 and the memory 115 discussed above for electronic device 110a in FIG. 3B. In such embodiments, the charging device 700 can execute the application 10 to process temperature data received from thermometer 100 and generate information based on the received temperature data, such as the thermal mass of the food 108, the completion time, the resting temperature rise, or specific cooking instructions. An indication of some or all of this generated information may be output on an output device of the charging apparatus 700, such as a display or on a speaker.

Figure 10A:
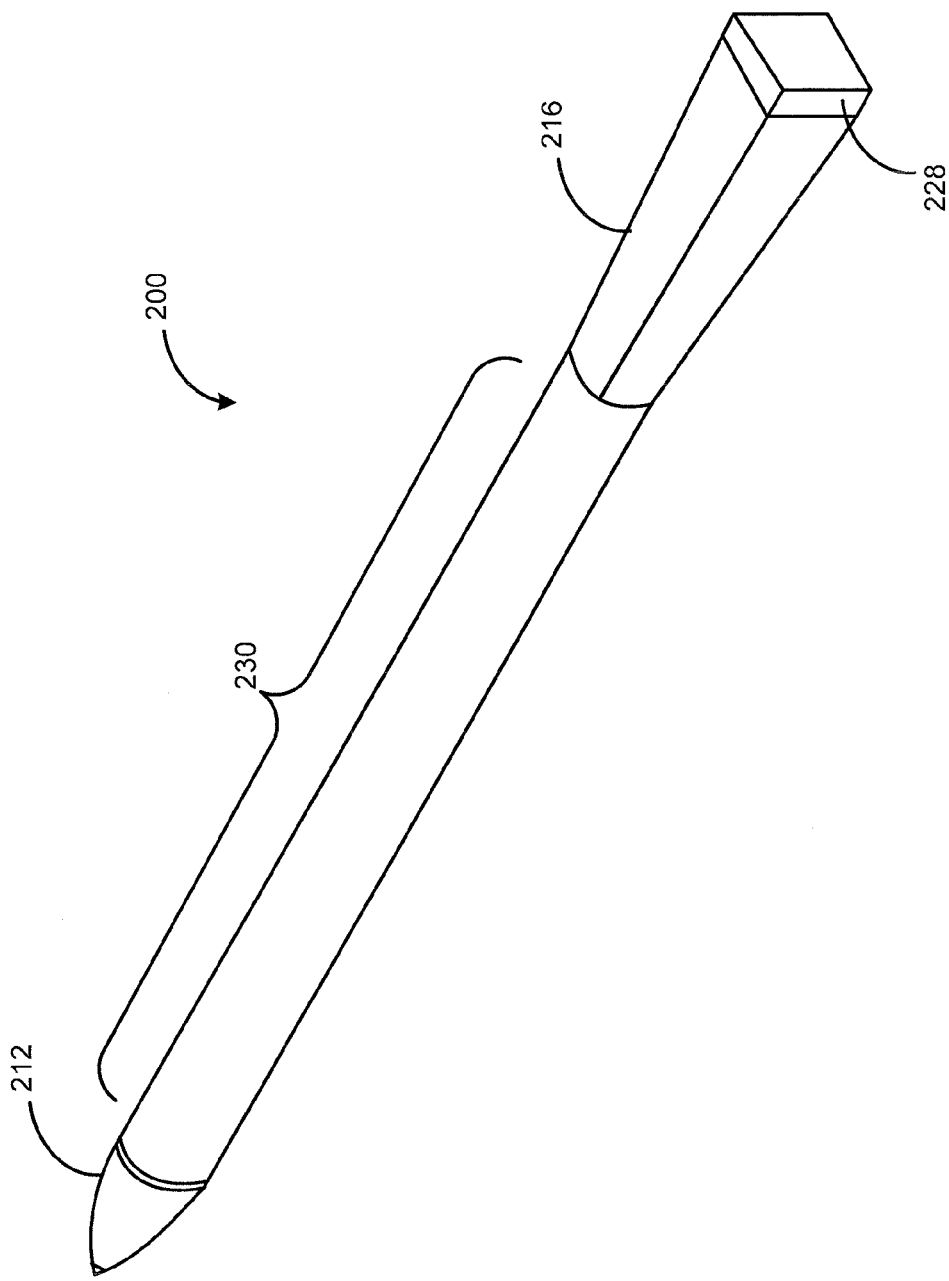
FIG. 10A shows an exterior view of a food thermometer according to an embodiment.

FIG. 10A shows an exterior view of another embodiment of a thermometer 200. The like numbers in the 200's range refer to similar components discussed above in the 100's range for the thermometer 100. The thermometer 200 includes a cylindrical pipe portion 230 located between a tip portion 212 and a handle 216 in an antenna region 202 corresponding to the third portion 102 of the thermometer 100 discussed above. At the distal end, a cap 228 is connected to the handle 216. Certain differences in shape between the thermometer 200 and the thermometer 100 such as the cylindrical shape of the pipe 230 or the shape of the cap 228 can be related to design considerations, such as aesthetics, lower manufacturing costs, durability or ease of use.

Figure 10B:
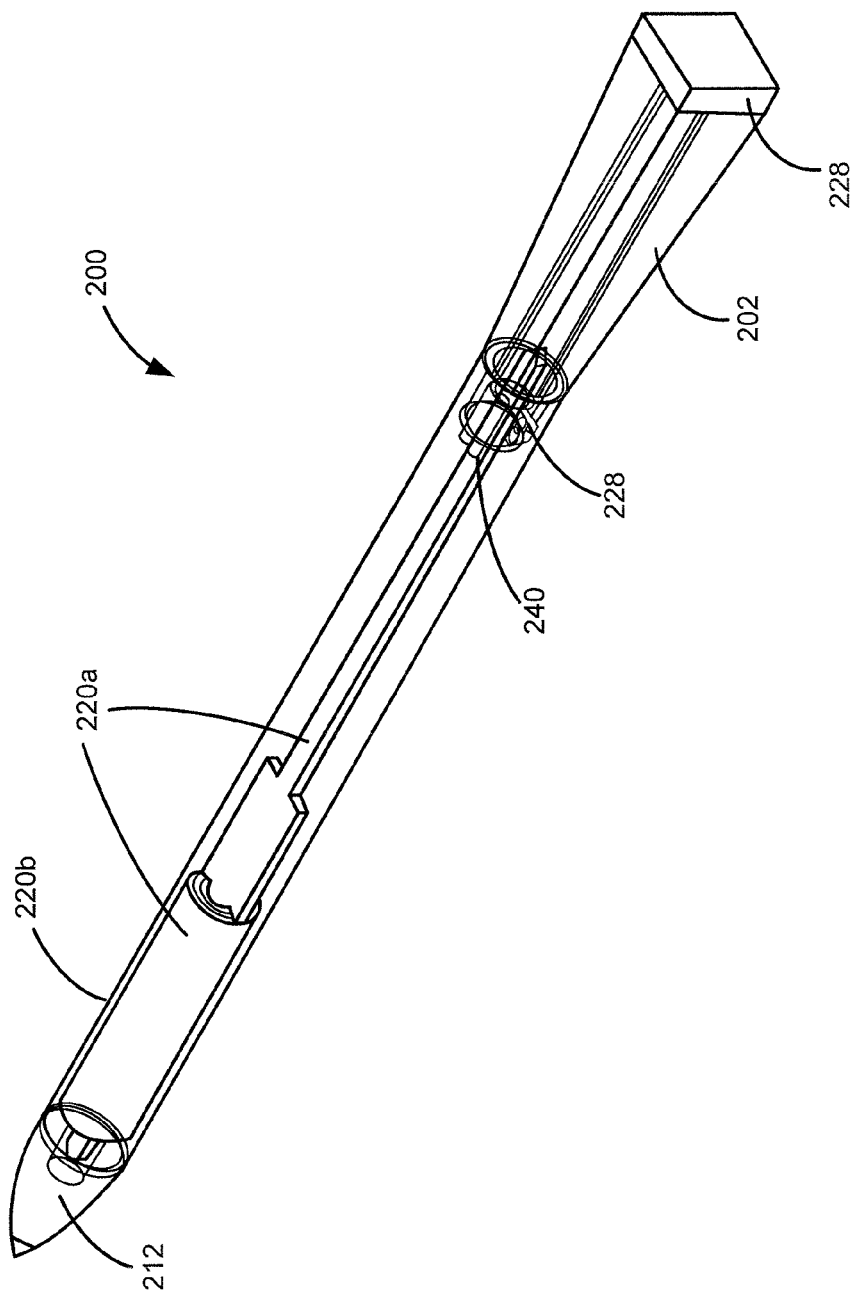
FIG. 10B shows internal components of the food thermometer of FIG. 10A according to an embodiment.
Figure 10C:
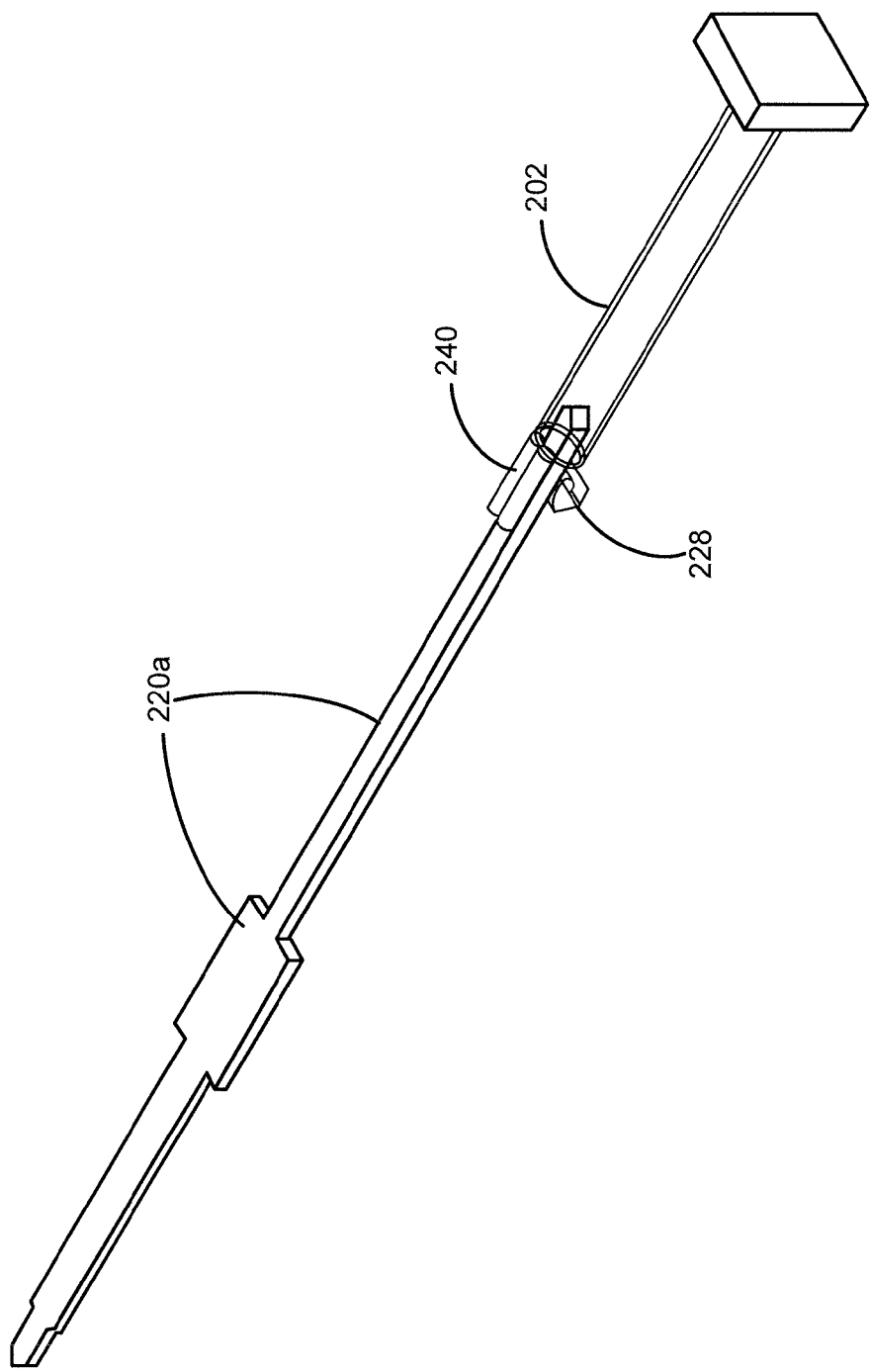
FIG. 10C further shows internal components of the food thermometer of FIG. 10B.
Figure 10D:
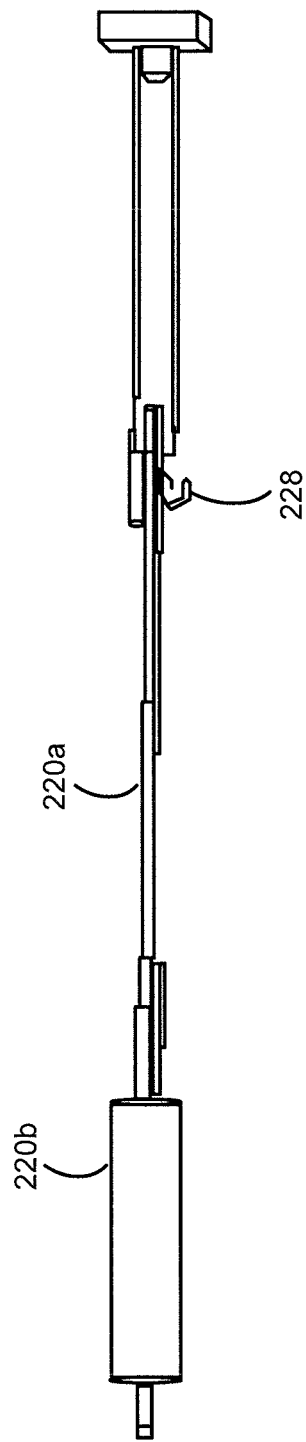
FIG. 10D is an internal side view of internal components of the food thermometer of FIG. 10B.

FIG. 10B shows a transparent view of the thermometer 200. A battery 220b is shown positioned around the PCB 220a contacts. Spring 228 provides an electrical ground contact for the electronics of the thermometer 200. As shown in FIG. 10B, the PCB 220a extends from the tip portion 212 through the pipe portion 230 and to the antenna region 202. However, the electronics that are sensitive to heat are located on the PCB 220a closer to the tip portion 212 than to the antenna region 202. Other electronics that are not as sensitive to heat can be located closer toward the antenna region 202. The temperature pair 240 provides ambient temperature measurement near an exterior of the food. FIG. 10C shows the PCB 220a, the temp pair 240, and grounding spring 228 in isolation to illustrate their exemplary structures. FIG. 10D is an internal side view of the thermometer 200.

As shown in FIG. 10D, the battery 232 is positioned near the tip portion 212 to allow the food to insulate the battery 232 from high temperatures. One of the advantages of this arrangement is utilizing the battery structure and positioning it in a manner to allow the battery to operate despite high temperatures in a cooking vessel that may otherwise degrade performance. Traditional electrolyte batteries for thermometers as known in the art may fail to operate under high temperature conditions due to a lack of high temperature tolerance and/or high temperature insulation. Due to the insulation provided by the food 108, the battery 232 can ordinarily have a lower operating temperature limit corresponding to a maximum food cooking temperature plus a factor of safety (e.g., 100° C. for meat).

In addition, the battery 232 in some implementations can include a solid-state battery that tolerates a relatively higher temperature, such as a thin film lithium battery that can tolerate up to 170° C. before performance degrades. In such an implementation, the battery 232 would also not include volatile solvents or liquid state chemicals that may further eliminate potential food safety concerns.

As set forth above, the thermometer 200 also advantageously utilizes ambient thermal sensing. Temperature measurement of a cooking vessel or ambient heat can be taken near the food being cooked to enhance the accuracy of temperature measurement since heat can vary from one location to another within a cooking vessel, such as a BBQ. For an RF-based thermometer such as the thermometer 100, the antenna can be located in the same portion of the thermometer as an ambient sensor, which is just outside the food 108. Such an embodiment advantageously combines the antenna and the thermal sensor as the portion 102 discussed above with respect to FIG. 1. One challenge is that the portion 102 may often need to withstand high temperatures within the cooking vessel that can reach up to 400° C.

Figure 11A:
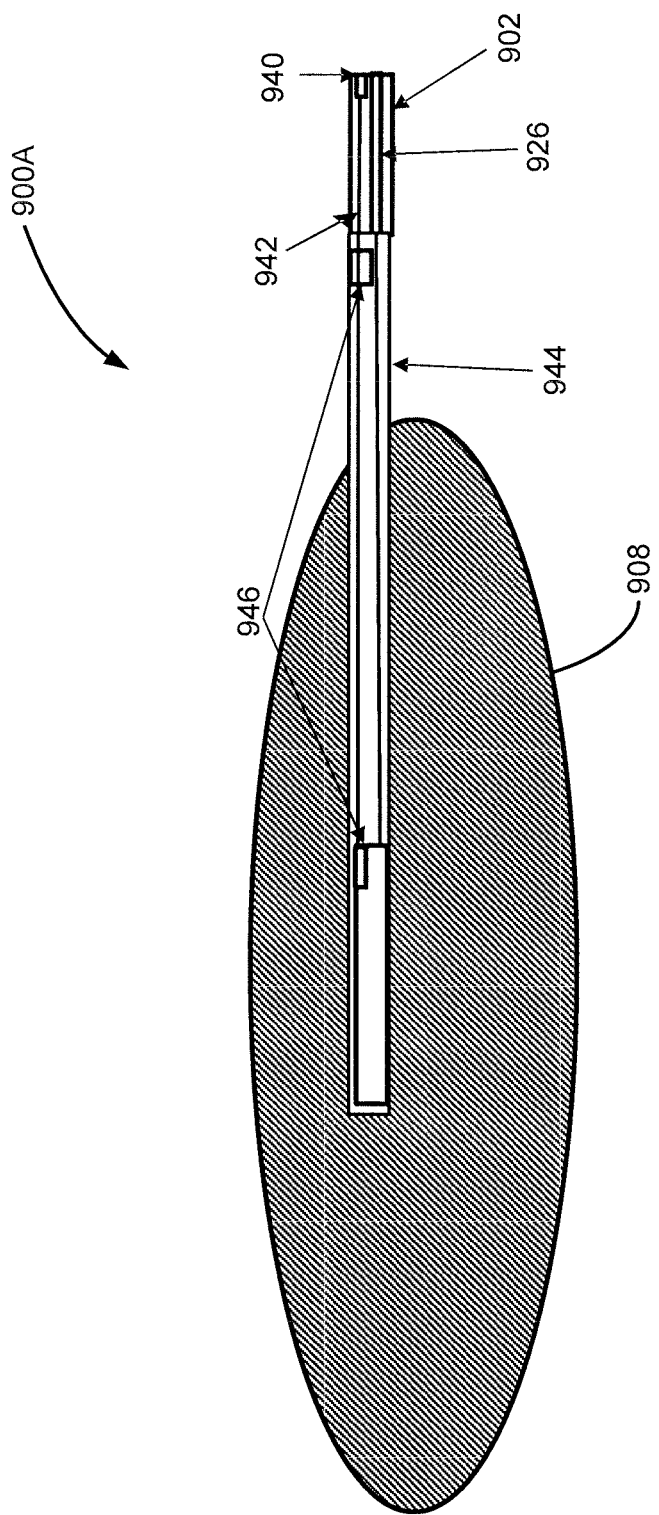
FIG. 11A shows a food thermometer including an ambient thermal sensor according to an embodiment.

Referring to FIG. 11A, one embodiment for sensing ambient temperature is shown. An ambient thermal sensor 940 may include an RTD, or other passive high temperature sensor such as a thermistor. The ambient thermal sensor 940 is positioned at an end of the thermometer 900A, away from the food for better accuracy when the thermometer 900A is inserted into the food 908. The antenna 926 is also located in an end portion of the thermometer 900A in antenna region 902, to avoid reduction of RF performance since the food 908 may otherwise attenuate RF signals.

The thermal sensor wire or wires 942 electrically connect the ambient thermal sensor 940 with a PCB in the thermometer 900A. In order to reduce interference to antenna functionality due to inductive and capacitive coupling between the antenna 926 and the sensor wire(s) 942, some implementations can advantageously increase a high frequency impedance between the thermal sensor wire(s) 942 and the ground plane (shell) 944. Filter components 946 can also be added to mitigate the deterioration of RF performance. The filter components 946 may include ferrite beads, inductors, capacitors, resistors, and/or other electronic components configured to mitigate the effect.

In other implementations, the PCB of the thermometer 900A can include an infrared sensor to measure a temperature of the antenna region 902 instead of using the ambient thermal sensor 940 in the antenna region 902. The temperature of the antenna region would then indirectly indicate the ambient temperature near the exterior of the food 908. In such implementations, infrared light radiated from a component in the antenna region 902, such as the antenna 926 or the handle, is detected by the infrared sensor to measure a temperature in the antenna region 902. A light guide may also be used to direct the infrared light from the antenna region 902 to the infrared sensor.

Figure 11B:
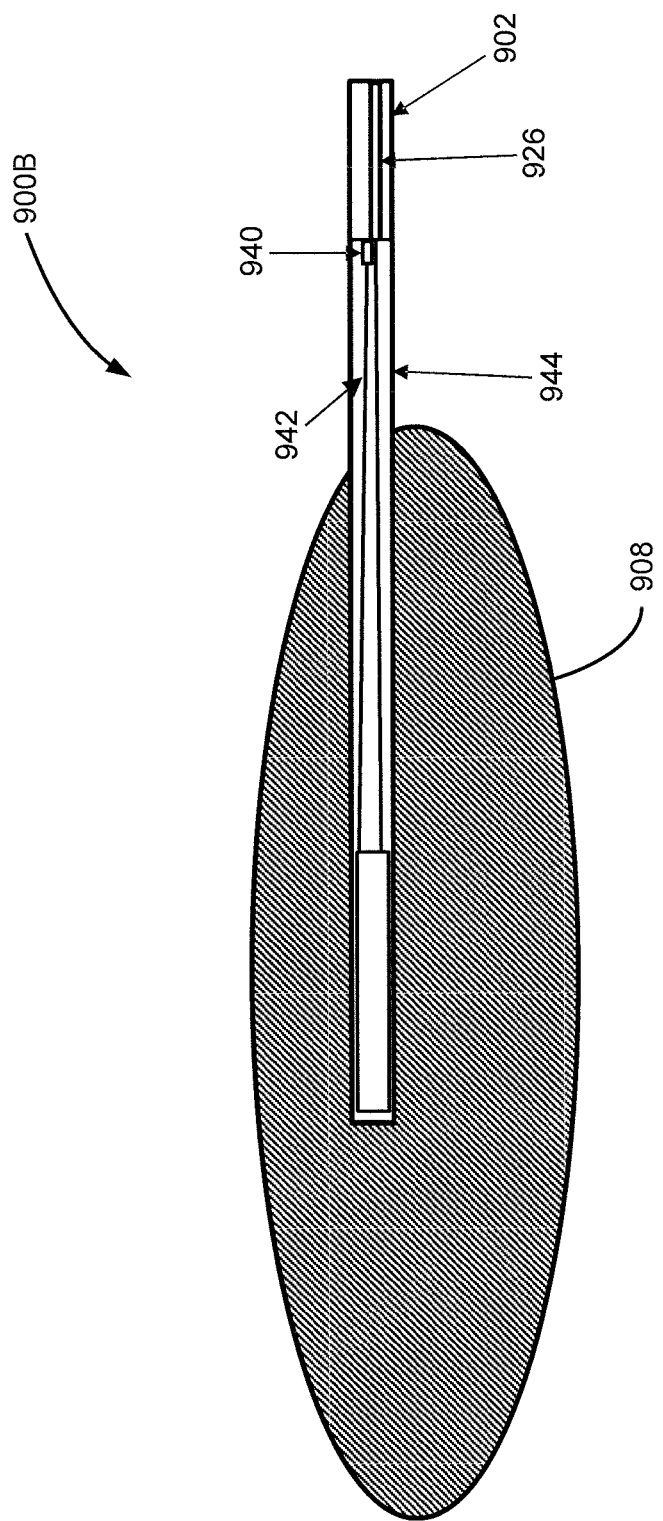
FIG. 11B shows a food thermometer including an ambient thermal sensor in a different location than in the food thermometer of FIG. 11A according to an embodiment.

Referring to FIG. 11B, an alternative arrangement of the thermometer 900B for sensing ambient temperature is shown. The ambient thermal sensor 940 may be an RTD, or other passive high temperature sensor. The location of the thermal sensor 940 can ordinarily reduce interference that might otherwise be caused by the thermal sensor 940. The antenna 926 is located at the distal end of the thermometer 900B, outside of the food 908 to avoid reduction of RF performance caused by the food 108 attenuating RF signals.

The ambient thermal sensor 940 is positioned outside of the antenna region 902 toward a center portion of the thermometer 900B and detects the ambient temperature via the antenna 926. In more detail, the ambient thermal sensor 940 is located inside the second portion 904 and is not directly exposed to the ambient space outside of the thermometer 900B. The ambient thermal sensor 940 is in thermal contact with the antenna 926 and indirectly detects the ambient temperature near an exterior portion of the food 908 via thermal conduction through the antenna 926, which may or may not be exposed to the ambient space near the exterior of the food 908.

One challenge associated with this arrangement is that the thermal sensor 940 is not directly detecting ambient temperature, but rather, the thermal sensor 940 is detecting the ambient temperature via mechanical couplings. Although thermometer 900B in FIG. 11B may have a better RF performance as compared to thermometer 900A in FIG. 11A, the thermal response for the thermal sensor 940 of thermometer 900B is typically slower and there can be some loss of thermal measurement resolution due to the indirect measurement through antenna 926.

Figure 11C:
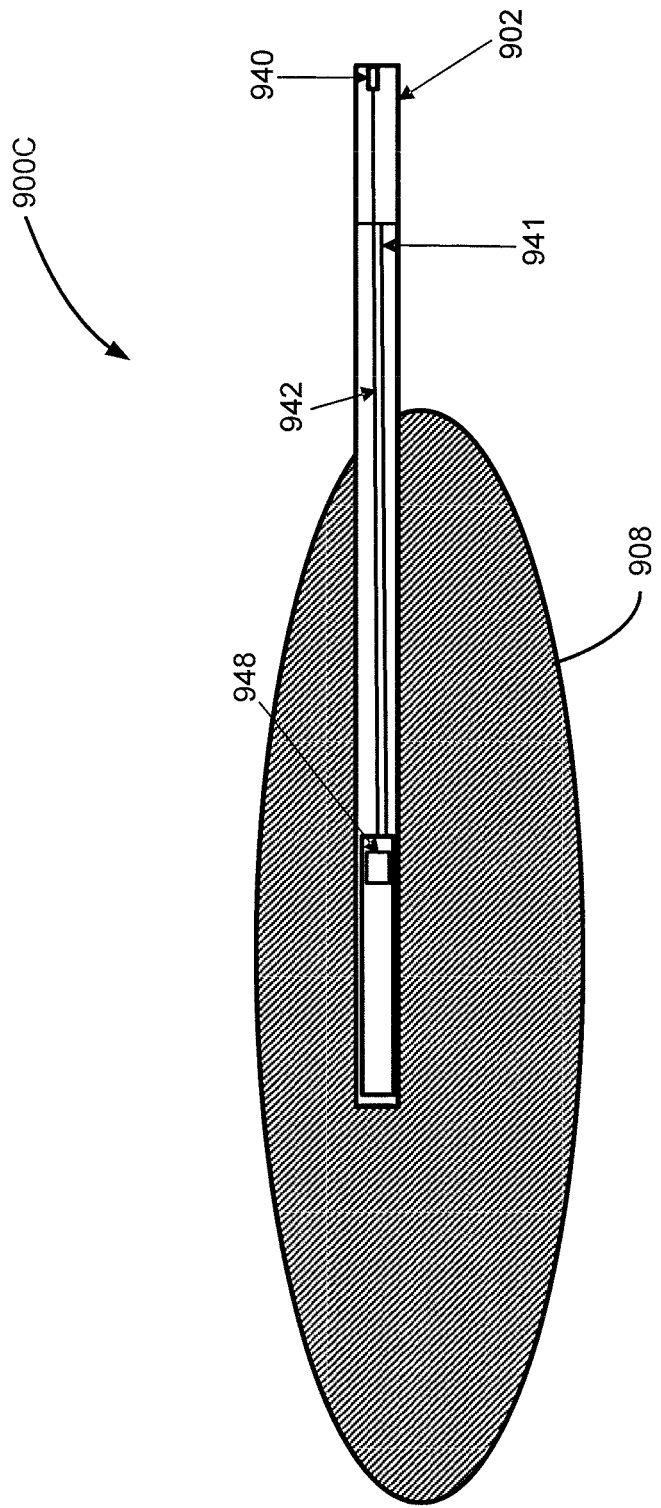
FIG. 11C shows a food thermometer including an ambient thermal sensor that is also used as an antenna according to an embodiment.

Referring to FIG. 11C, an alternative arrangement for sensing ambient temperature is shown. In thermometer 900C, the thermal sensor 940 and the thermal sensor wire or wires 942 are used as at least part of an antenna. As shown in FIG. 11C, the thermal sensor wiring 942 extends from the electronics of 920a in the first portion 906, and through the second portion 904 to reach the ambient thermal sensor 940 in the third portion 902. Mixer 948 combines RF signals to the thermal sensor wire(s) 942. Thermal sensor wire(s) 942 then work as antenna(s) after separating from ground reference 941. For ground referenced antennas, a dipole antenna could also be used but it may require a larger size for similar performance. The arrangement of thermometer 900C advantageously enhances RF performance and increases time and accuracy of the thermal sensor 940.

In order for the thermometer 900C to be re-chargeable, it can receive power from an external power source to recharge. This can be challenging when having to confine charging to an end of the thermometer (e.g., region 902 that houses the antenna 926) which is external to food 908. Antenna region 902 may have to endure relatively high ambient temperatures up to 400° C. and maintain sealing to prevent water or other contaminants from entering the thermometer 900C.

Figure 11D:
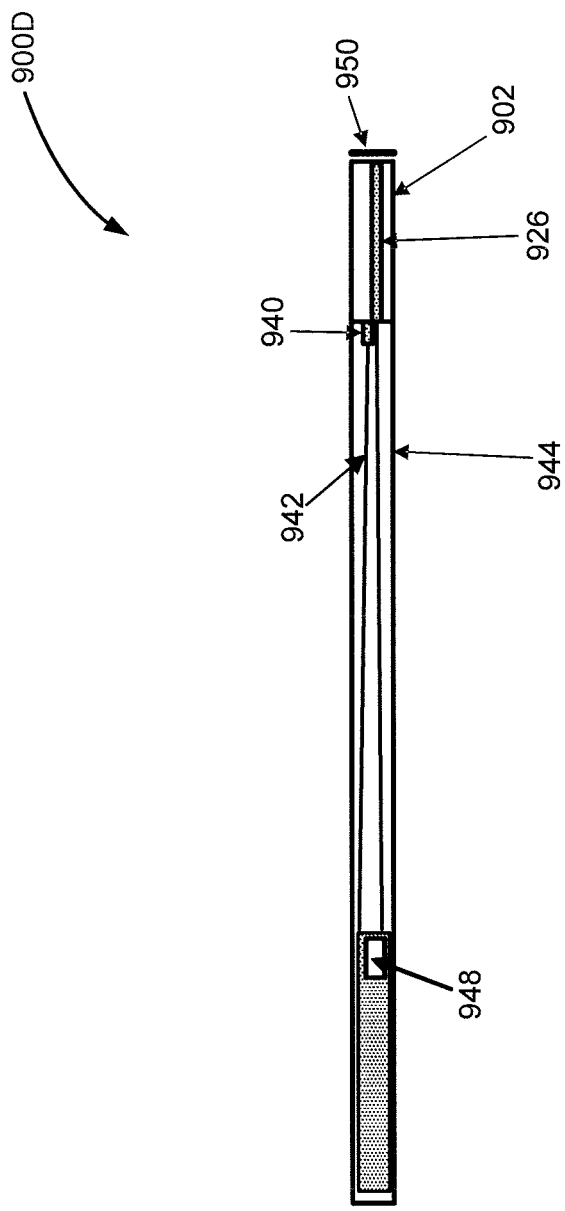
FIG. 11D, shows a food thermometer including a charging contact according to an embodiment.

Referring to FIG. 11D, an external electric contact 950 is provided for charging the battery of the food thermometer 900D. The discrete external electric contact 950 is configured to allow the thermometer 900D to receive power from an external source, such as charging device 700 discussed above for recharging the battery.

In the example of FIG. 11D, the external electric contact 950 is connected with the antenna 926, thereby combining antenna and charging to relate to the same electrical signal. RF signals are separated from charging using a separator filter 948. This feature advantageously allows co-locating both types of signals in antenna region 902 without interference.

In an alternative arrangement, inductive charging can be applied to charge the thermometer 900D. However, inductive charging may require a relatively large inductive component. As such, some implementations can use a discrete charging contact instead of inductive charging due to advantages related to size, simplicity, and efficiency of the electronics.

In some implementations, the thermometer 900D can save power by turning off radio communications when charging via charging contact 950. This can ordinarily reduce the size of the battery needed for the thermometer 900D. In one implementation, a charging device such as charging device 700 can be used to communicate with electronics of the thermometer 900D via the charging contact 950. Wireless products may need user control for operations such as the Bluetooth pairing process. The user may need to be able to send simple messages to the thermometer 900D by physical means before being able to establish RF communication. In conventional devices, such messages are usually given via mechanical means such as a push button or switch. In the example of thermometer 900D such messages by be sent by pressing a button on the charging device 700 and using the charging contact to send the message via a physical connection through antenna 926, thermal sensor 940, and thermal sensor wiring 942 to reach the separator filter 948, which can include RF/control signal filter components to separate received control signals from RF signals for transmission via antenna 926. In this regard, the filter components 948 can be utilized to separate control signals from RF signals. Control signals can be sent using low frequency signals, thereby making it easier to separate them from RF signals with frequency filters of the filter components 948.

The thermometer 900D may also need to sustain high temperatures and maintain sealing from external contaminants. Mechanical simplicity may then be desirable and can be obtained by avoiding additional mechanical switches or buttons on the thermometer 900D. The thermometer 900D can advantageously use the recharging contact 950 to send signals to the portable electronic device, thereby enhancing mechanical simplicity.

Figure 11E:
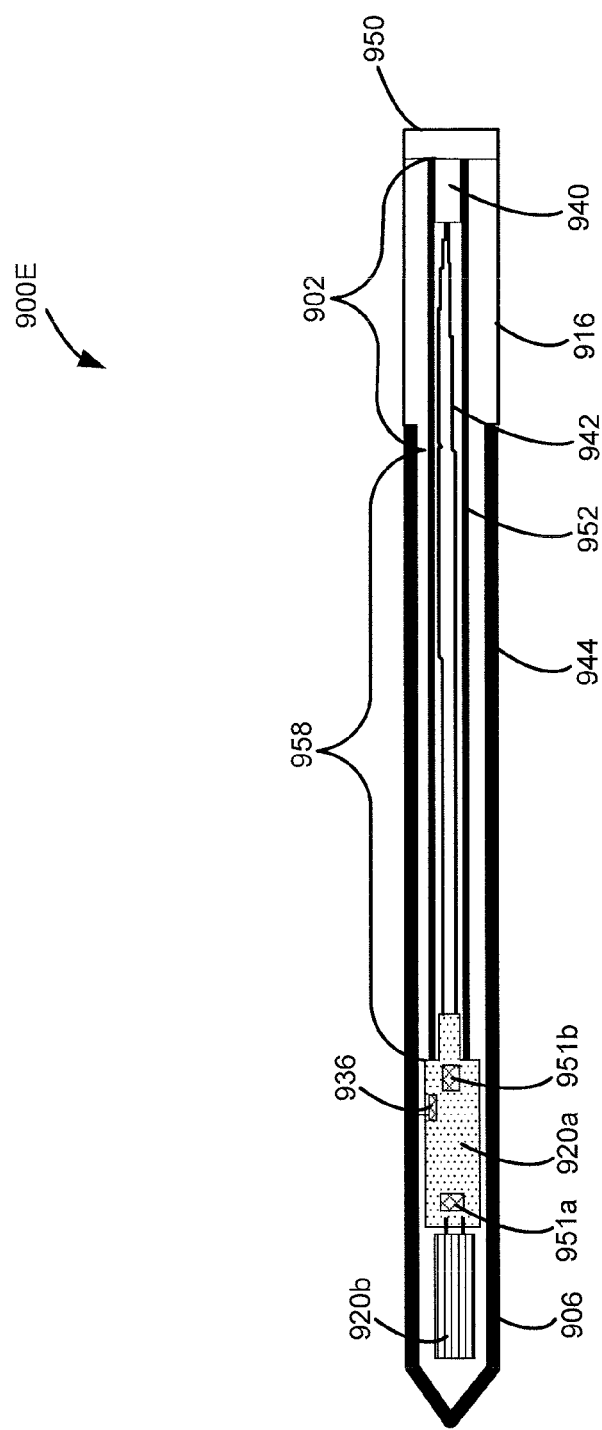
FIG. 11E shows a food thermometer including an inner shell according to an embodiment.

FIG. 11E illustrates an arrangement of the thermometer 900E where an inner shell 952 is used as at least part of an antenna in an antenna portion 926 of the inner shell 952, and also used as part of a coaxial wave guide with the outer shell 944 in a coaxial transmission portion 958 of the inner shell 952. As shown in FIG. 11E, the charging contact 950, thermal sensor 940, the thermal sensor wiring 942, and the antenna portion 926 of the inner shell 952 comprise an antenna. The antenna portion 926 is located within the hilt 916, which can include a ceramic material.

The inner shell 952 can be made of a conductive material such as copper, which can transmit a signal from the PCB 920a or other electronics in the first or second portions of the thermometer 900E to the antenna in the third portion 902 for transmission to a remote portable device or a charging device. The coaxial transmission portion 958 of the inner shell 952 is located within the metallic outer shell 944, which can include a stainless steel material. The metal outer shell 944 works with the coaxial transmission portion 958 of the inner shell 952 to serve as a waveguide so that an antenna RF signal is generally confined between the outer shell 944 and the inner shell 952 in the second portion.

The thermal sensor wiring 942 and the ambient thermal sensor 940 are located inside the inner shell 952, which generally shields them from the antenna RF signal between the inner shell 952 and the outer shell 944. As a result, interference is reduced in both the temperature signal conducted in the sensor wiring 942 and the antenna RF signal conducted in the coaxial transmission waveguide. In other words, placing the sensor wiring 942 inside the inner shell 952 can ordinarily avoid RF influence on the antenna signal and interference in the temperature signal carried in the sensor wiring 942. In this regard, some implementations may use air or another dielectric material as an insulator between the sensor wiring 942 and the inner shell 952 to further reduce interference between the temperature signal and the antenna signal.

In the example of FIG. 11E, the ambient thermal sensor 940 indirectly measures the ambient temperature through the charging contact 950. This can allow for the measurement of the ambient temperature at a preferred location on the end of the thermometer 900E. In some implementations, the ambient thermal sensor 940 can include a thermocouple.

The combination of the charging contact 950 and the inner shell 952 serves as a charging path for charging the battery 920b in the first portion 906 of the thermometer 900E. The PCB 920a located in the second portion 904 and includes grounded terminals 951 at both the terminal 951a connecting the battery 920b and at the terminal 951b connecting the sensor wiring 942. The terminals 951 are grounded on the outer metal shell 944, and the contacts for the thermal sensor wiring 942 on the PCB 920a are inside the inner shell 952 to further reduce possible RF interference. The PCB 920a can include a microstrip line for carrying an antenna signal and a transformer to convert the antenna signal from the microstrip line to the coaxial transmission portion of the inner shell 952.

The thermal sensor 936 in mounted on the PCB 920a and detects a temperature of the outer shell 944 for measuring a temperature of the interior of the food. Since sensor 936 is behind the coaxial transmission portion of the inner shell 952, there is no interference with the RF antenna signal transmitted to the antenna portion 902.

In summary, the inner shell 952 is configured to provide one or more of four different functions in the thermometer 900E. The first function can be as at least part of an antenna in the antenna portion 902 of the inner shell 952. The second function can be as a coaxial transmission line inside the outer shell 944 to carry a signal between the antenna portion 902 and electronics, such as those located on the PCB 920a. The third function can be as a conductor for charging the battery 920b via the charging contact 950. The fourth function can be for communicating an activation or deactivation of the thermometer 900E depending on whether the thermometer 900E is charging via the charging contact 950. As noted above, activation can include enabling a pairing mode via the antenna.

By serving multiple functions with the inner shell 952, it is ordinarily possible to condense the size of thermometer 900E, while improving its performance in terms of the RF signal of the antenna and the accuracy of ambient temperature measurement.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A food thermometer for measuring a temperature of a food exposed to heat, the food thermometer comprising:
    a first portion including electronic components that are sensitive to heat, the first portion configured to be positioned in the food;
    a second portion connected to the first portion, wherein at least the first portion or the second portion includes a thermal sensor for detecting the temperature of the food;
    a third portion connected to the second portion, the third portion including an antenna for wirelessly transmitting data based on the detected temperature of the food;
    an outer shell extending from the second portion to the third portion; and
    an inner shell inside the outer shell and extending from the second portion into the third portion, wherein the inner shell with the outer shell in the second portion serve as a coaxial transmission waveguide for an antenna signal, and wherein the inner shell in the third portion serves as at least part of the antenna.

2. The food thermometer of claim 1, further comprising an ambient thermal sensor located in the third portion and configured to detect an ambient temperature near an exterior of the food.

3. The food thermometer of claim 2, further comprising thermal sensor wiring extending through the second portion and electrically connecting electronics in the first portion or the second portion to the ambient thermal sensor in the third portion, wherein the thermal sensor wiring and the ambient thermal sensor are configured to serve as at least part of the antenna in the third portion.

4. The food thermometer of claim 3, wherein the ambient thermal sensor includes a Resistance Temperature Detector (RTD), one or more thermistors, or an infrared sensor.

5. The food thermometer of claim 1, further comprising an ambient thermal sensor positioned inside the second portion and in thermal contact with the antenna, wherein the ambient thermal sensor is configured to indirectly detect an ambient temperature near the exterior of the food through thermal conduction via the antenna.

6. The food thermometer of claim 1, further comprising:
    an ambient thermal sensor located in the third portion; and
    sensor wiring inside the inner shell connecting the ambient thermal sensor to electronics in the first portion or the second portion.

7. The food thermometer of claim 1, further comprising a charging contact for charging the food thermometer, wherein the charging contact is in electrical communication with the inner shell, and wherein the inner shell is configured to carry a charging signal from the charging contact to electronics in the first portion or in the second portion.

8. The food thermometer of claim 1, further comprising:
    a charging contact located in the third portion for charging the food thermometer, wherein the charging contact is in electrical communication with the antenna so that the antenna is configured to carry a charging signal from the charging contact; and filter components configured to separate the charging signal from a Radio Frequency (RF) signal for the antenna.

9. The food thermometer of claim 1, further comprising:
a charging contact located in the third portion for charging the food thermometer, wherein the charging contact is in electrical communication with the antenna so that the antenna is configured to carry a message signal received at the charging contact through contact with an external device; and filter components configured to separate the message signal from a Radio Frequency (RF) signal for the antenna.

10. The food thermometer of claim 1, further comprising an ambient thermal sensor located in at least the third portion or the second portion and configured to detect an ambient temperature near an exterior of the food, wherein the ambient temperature detected by the ambient thermal sensor is used to determine a stage of cooking during a cooking process of the food.

11. The food thermometer of claim 1, wherein the food thermometer is wirelessly connected to a remotely located computer-based portable electronic device, and wherein the electronic components include a processor configured to:
receive a temperature threshold from the remotely located computer-based portable electronic device;
determine that the detected temperature of the food has reached or exceeds the temperature threshold; and
transmit, using the antenna, a signal to the remotely located computer-based portable electronic device for indicating that the food has reached or exceeds the temperature threshold.

12. The food thermometer of claim 11, wherein at least one of the food thermometer or the remotely located computer-based portable electronic device is configured to estimate at least one of a completion time for cooking the food and a resting temperature rise that will follow the removal of the food from heat.

13. A food thermometer for measuring a temperature of a food exposed to heat, the food thermometer comprising:
an outer shell including a metallic portion and a non-metallic portion;
a thermal sensor in the metallic portion of the outer shell for detecting a temperature of the food when the food thermometer is inserted into the food; and
an inner shell inside the outer shell and extending from the metallic portion of the outer shell into the non-metallic portion of the outer shell, wherein the inner shell in the non-metallic portion of the outer shell serves as at least part of an antenna, and wherein the inner shell with the metallic portion of the outer shell serve as a coaxial transmission waveguide for an antenna signal for transmission by the antenna.

14. The food thermometer of claim 13, further comprising:
an ambient thermal sensor located inside the inner shell; and
sensor wiring inside the inner shell connecting the ambient thermal sensor to electronics in the food thermometer.

15. The food thermometer of claim 13, further comprising a charging contact for charging the food thermometer, wherein the charging contact is in electrical communication with the inner shell, and wherein the inner shell is configured to carry a charging signal from the charging contact to electronics in the food thermometer.

16. The food thermometer of claim 13, further comprising:
a charging contact for charging the food thermometer, wherein the charging contact is in electrical communication with the antenna so that the antenna is configured to carry a charging signal from the charging contact; and filter components configured to separate the charging signal from a Radio Frequency (RF) signal for the antenna.

17. The food thermometer of claim 13, further comprising:
a charging contact for charging the food thermometer, wherein the charging contact is in electrical communication with the antenna so that the antenna is configured to carry a message signal received at the charging contact through contact with an external device; and filter components configures to separate the message signal from a Radio Frequency (RF) signal for the antenna.

18. A food thermometer for measuring a temperature of a food exposed to heat, the food thermometer comprising:
a first portion including electronic components that are sensitive to heat, the first portion configured to be positioned in the food;
a second portion connected to the first portion, wherein at least the first portion or the second portion includes a thermal sensor for detecting the temperature of the food;
a third portion connected to the second portion, the third portion including an antenna for wirelessly transmitting data based on the detected temperature of the food;
a charging contact located in the third portion for charging the food thermometer, wherein the charging contact is in electrical communication with the antenna so that the antenna is configured to carry a charging signal from the charging contact; and
filter components configured to separate the charging signal from a Radio Frequency (RF) signal for the antenna.

19. The food thermometer of claim 18, further comprising:
an ambient thermal sensor located in the third portion and configured to detect an ambient temperature near an exterior of the food; and
sensor wiring extending through the second portion and electrically connecting electronics in the first portion or the second portion to the ambient thermal sensor in the third portion, wherein the thermal sensor wiring and the ambient thermal sensor are configured to serve as at least part of the antenna in the third portion, and wherein the ambient thermal sensor includes a Resistance Temperature Detector (RTD), one or more thermistors, or an infrared sensor.

* * * * *